(12) United States Patent
Webster et al.

(10) Patent No.: US 7,186,383 B2
(45) Date of Patent: *Mar. 6, 2007

(54) MINIATURIZED FLUID DELIVERY AND ANALYSIS SYSTEM

(75) Inventors: James Russell Webster, Hsinchu (TW); Yuan-Fong Kuo, Hsinchu (TW); Shaw-Tsu Wang, Taipei (TW); Lung-Wen Tai, Taichung (TW)

(73) Assignee: AST Management Inc., Apia (WS)

( * ) Notice: Subject to any disclaimer, the term of this patent is extended or adjusted under 35 U.S.C. 154(b) by 0 days.

This patent is subject to a terminal disclaimer.

(21) Appl. No.: 11/078,993

(22) Filed: Mar. 11, 2005

(65) Prior Publication Data

US 2005/0180891 A1 Aug. 18, 2005

Related U.S. Application Data

(63) Continuation-in-part of application No. 10/437,046, filed on May 14, 2003.

(30) Foreign Application Priority Data

Sep. 27, 2002 (TW) .................................. 91122431 A

(51) Int. Cl.
  *G01N 1/10* (2006.01)
(52) U.S. Cl. ..................... 422/100; 422/81; 422/103; 436/180; 436/518; 436/524; 435/287.2; 435/287.3
(58) Field of Classification Search .................. 422/81, 422/100, 103; 436/46, 180, 518, 524; 435/6, 435/7.1, 287.1, 287.2, 287.3, 288.4, 288.5
See application file for complete search history.

(56) References Cited

U.S. PATENT DOCUMENTS

| | | | | |
|---|---|---|---|---|
| 6,073,482 A | * | 6/2000 | Moles | 73/53.01 |
| 6,767,194 B2 | * | 7/2004 | Jeon et al. | 417/559 |
| 2002/0098097 A1 | * | 7/2002 | Singh | 417/413.1 |
| 2004/0063217 A1 | * | 4/2004 | Webster et al. | 436/180 |

* cited by examiner

*Primary Examiner*—Maureen M. Wallenhorst
(74) *Attorney, Agent, or Firm*—Jones Day; Brett Lovejoy

(57) ABSTRACT

An apparatus providing a fluidic cartridge including a first and second substrate and an intermediate interlayer is disclosed. The intermediate interlayer is sealedly interfaced between the first and second substrates to form therein a plurality of channels of capillary dimensions. The apparatus further includes an open reservoir, a pump chamber and a reaction chamber. The open reservoir and reaction chamber are each connected to the pump chamber through the channels. The open reservoir and reaction chamber are in fluid communication with each other via the channels. The apparatus further provides a fluid flow controlling structure, formed in the fluidic cartridge, which restricts a flow of a fluid through the reaction chamber to one direction. The apparatus further provides a linear actuator for providing a pumping action in the pump chamber to pump the fluid to recirculate from the reaction chamber to the open reservoir via the channels and pump chamber.

19 Claims, 15 Drawing Sheets

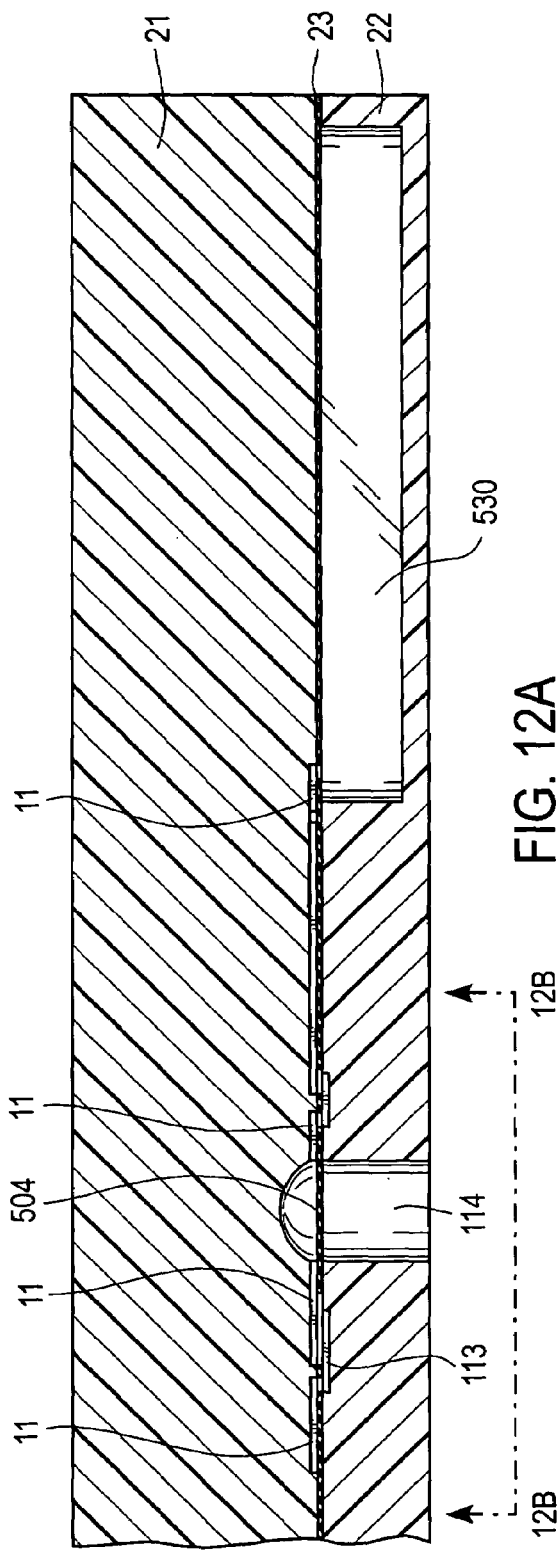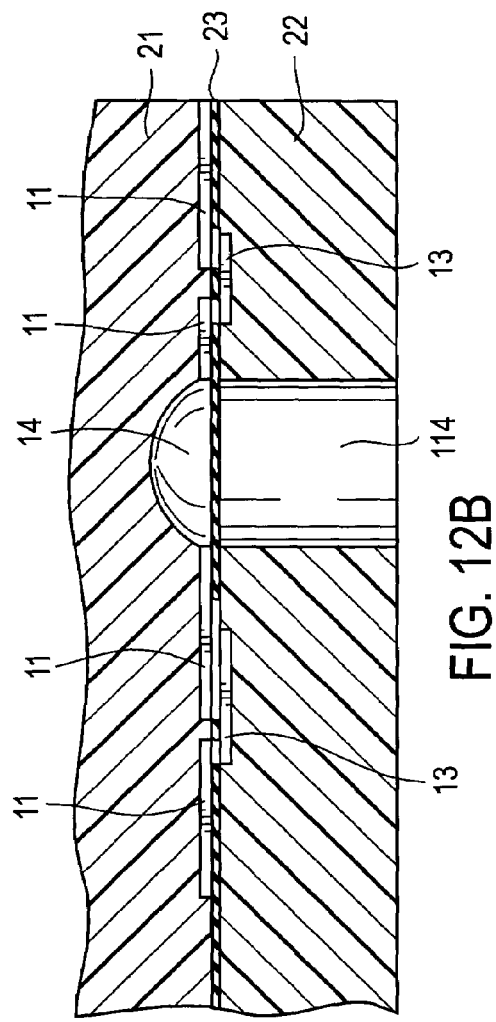

MINIATURIZED FLUID DELIVERY AND ANALYSIS SYSTEM

CROSS REFERENCE TO RELATED APPLICATIONS

This application is a continuation-in-part of U.S. patent application Ser. No. 10/437,046, filed May 14, 2003, which is incorporated by reference herein in its entirety. This application further claims priority, under 35 U.S.C. § 119, to Taiwanese patent application number 91122431, which was filed Sep. 27, 2002, and which is hereby incorporated by reference in its entirety.

FIELD OF THE INVENTION

This invention relates to systems comprising a fluid delivery and analysis cartridge and external linear actuators. More particularly, the invention relates to systems and methods for carrying out various processes, including screening, immunological diagnostics, DNA diagnostics, in a miniature fluid delivery and analysis cartridge.

BACKGROUND OF THE INVENTION

Recently, highly parallel processes have been developed for the analysis of biological substances such as, for example, proteins, peptides, nucleic acids (e.g., DNA, cDNA, etc.) and ribonucleic acids. Large numbers of different binding moieties can be immobilized on solid surfaces and interactions between such moieties and other compounds can be measured in a highly parallel fashion. While the size of the solid surfaces have been remarkably reduced over recent years and the density of immobilized species has also dramatically increased, typically such assays require a number of liquid handling steps that can be difficult to automate without liquid handling robots or similar apparatuses.

A number of microfluidic platforms have recently been developed to solve such problems in liquid handling, reduce reagent consumptions, and to increase the speed of such processes. Examples of such platforms are described in U.S. Pat. Nos. 5,856,174 and 5,922,591, which are hereby incorporated by reference in their entireties. Such devices were later shown to perform nucleic acid extraction, amplification and hybridization on HIV viral samples as described by Anderson et al., "Microfluidic Biochemical Analysis System," Proceeding of the 1997 International Conference on Solid-State Sensors and Actuators, Tranducers '97, 1997, pp. 477–480, which is hereby incorporated by reference in its entirety. Through the use of pneumatically controlled valves, hydrophobic vents, and differential pressure sources, fluid reagents were manipulated in a miniature fluidic cartridge to perform nucleic acid analysis.

Another example of such a microfluidic platform is described in U.S. Pat. No. 6,063,589, which is hereby incorporated by reference in its entirety, where the use of centripetal force is used to pump liquid samples through a capillary network contained on a compact-disc liquid fluidic cartridge. Passive burst valves are used to control fluid motion according to the disc spin speed. Such a platform has been used to perform biological assays as described by Kellog et al, "Centrifugal Microfluidics: Applications," Micro Total Analysis System 2000, Proceedings of the uTas 2000 Symposium, 2000, pp. 239–242, which is hereby incorporated by reference in it entirety. The further use of passive surfaces in such miniature and microfluidic devices has been described in U.S. Pat. No. 6,296,020, which is hereby incorporated by reference in its entirety, for the control of fluid in micro-scale devices.

An alternative to pressure driven liquid handling devices is through the use of electric fields to control liquid and molecule motion. Work in miniaturized fluid delivery and analysis has been done using these electro-kinetic methods for pumping reagents through a liquid medium and using electrophoretic methods for separating and performing specific assays in such systems. Devices using such methods have been described in U.S. Pat. Nos. 4,908,112, 5,858,804, 6,033,544, each of which is hereby incorporated by reference in its entirety.

Other miniaturized liquid handling devices have also been described using electrostatic valve arrays (U.S. Pat. No. 6,240,944, which is hereby incorporated by reference in its entirety), ferrofluid micropumps (U.S. Pat. No. 6,318,970, which is hereby incorporated by reference in its entirety), and a fluid flow regulator (U.S. Pat. No. 5,839,467, which is hereby incorporated by reference in its entirety).

While it is well understood that active, continuous mixing of chemical reactions greatly increases reaction rates due to the elimination of diffusion limiting conditions, most diagnostic products such as 96-well microwell plate kits and other automatic equipment still utilize static reactions. Typical attempts to increase reaction rates include increasing reaction temperatures, mechanical shaking, as well as ultrasonic agitation. As reaction volumes decrease in size it becomes more and more difficult to provide continuous mixing conditions. Alternatively, microfluidic devices can increase assay speeds by increasing surface to volume ratios. Static reactions on microfluidic devices, however, are still governed by diffusion limited reaction kinetics. Attempts have been made to improve reaction kinetics by continuously flowing reactants over active surfaces. See, for example, Cheek et al., 2001, "Chemiluminescence Detection for Hybridization Assays on the Flow-Thru Chip, a Three-Dimensional Micorchannel Biochip," Analytical Chemistry 73, 5777–5783, which is hereby incorporated by reference in its entirety. This technique, however requires, large reactant volumes or extremely low flow rates. Back and forth motion has also been employed using a pressurized chamber to speed up reaction times. See, for example, Anderson et al., 2000, "A miniature integrated device for automated multistep genetic analysis," Nucleic Acids Research 28, e60, which is hereby incorporated by reference in its entirety. The circulation method in a closed system has also been proposed for speeding up DNA hybridization reactions. See, for example, Chou et al., "Integrated Elastomer Fluidic Lab on a Chip—Surface Patterning and DNA diagnostics," in Proceedings of the Solid State Actuator and Sensor Workshop, Hilton Head, S.C., 2000, which is hereby incorporated by reference in its entirety. While such a device is functional, it is somewhat unsatisfactory because it requires two pumps operating out of phase to enable circulation. The operation of two pumps operating out of phase adds expense to the chip.

The use of such miniaturized liquid handling devices has the potential to increase assay throughput, reduce reagent consumption, simplify diagnostic instrumentation, and reduce assay costs. Given the above background, what is needed in the art are improved closed system miniature fluid delivery and analysis cartridges.

SUMMARY OF THE INVENTION

The present invention addresses the shortcoming found in the prior art. The present invention provides improved closed system miniature fluid delivery and analysis cartridges. In the apparatus of the present invention, a closed system architecture is realized using only a single pump. Therefore, the present invention provides miniature on chip closed system reactions using devices that are cheaper to build and easier to use then previously known systems.

One aspect of the present invention is a system comprising a plastic fluidic device having at least one reaction chamber connected to pumping structures through capillary channels and external linear actuators. The device comprises two plastic substrates, an upper substrate and a lower substrate containing capillary channel(s), reaction chamber(s), and pump/valve chamber(s)—and a flexible intermediate interlayer between the upper and lower substrate that provides a sealing interface for the fluidic structures as well as valve and pump diaphragms. Passive check valve structures are formed in the three layer device by providing a means for a gas or liquid to flow from a channel in the lower substrate to a channel in the upper substrate by the bending of the interlayer diaphragm. Furthermore, flow in the opposite direction is controlled by restricting the diaphragm bending motion with the lower substrate. Alternatively check valve structures can be constructed to allow flow from the upper substrate to the lower substrate by flipping the device structure. Pump structures are formed in the device by combining a pump chamber with two check valve structures operating in the same direction. A hole is also constructed in the lower substrate corresponding to the pump chamber. A linear actuator, external to the plastic fluidic device, can then be placed in the hole to bend the pump interlayer diaphragm and therefore provide pumping action to fluids within the device. Such pumping structures are inherently unidirectional.

In one embodiment, the above system can be used to perform immunoassays by pumping various reagents from an inlet reservoir, through a reaction chamber containing a plurality of immobilized antibodies or antigens, and finally to an outlet port. In another embodiment the system can be used to perform assays for protein, DNA or RNA analysis such as hybridization to DNA probes immobilized in the reaction chamber. In still another embodiment the device can be used to synthesize a series of oligonucleotides within the reaction chamber. While the above-described system is well suited to perform solid-phase reactions within the reaction chamber and to provide the means of distributing various reagents to and from the reaction chamber, it is not intended to be limited to performing solid-phase reactions only.

Systems in accordance with the present invention are also well suited for disposable diagnostic applications. The use of such systems in accordance with the present invention can reduce the consumables to only the plastic fluidic cartridge and can eliminate any cross contamination issues arising through the use of fixed-tipped robotic pipettes common in high-throughput applications.

Another aspect of the invention provides an apparatus comprising a fluidic cartridge including a first and second substrate and an intermediate interlayer. The intermediate interlayer is sealedly interfaced between the first and second substrates to form therein a plurality of channels of capillary dimensions. The apparatus further includes an open reservoir, a pump chamber and a reaction chamber. The open reservoir and reaction chamber are each connected to the pump chamber through the channels. The open reservoir and reaction chamber are in fluid communication with each other via the channels. The apparatus further comprises a fluid flow controlling structure, formed in the fluidic cartridge, which restricts a flow of a fluid through the reaction chamber to one direction. The apparatus further comprises a linear actuator for providing a pumping action in the pump chamber to pump the fluid to flow between the open reservoir and reaction chamber via the plurality of channels and pump chamber.

Another aspect of the invention provides a pump structure comprising a first substrate, a second substrate and a flexible intermediate interlayer. The flexible intermediate interlayer is sealedly interfaced between the first substrate and the second substrate. The pump structure further comprises a pump chamber, as well as a fluid flow controlling structure, formed in the first substrate and the second substrate, thereby restricting a flow of a fluid through said pump chamber to a first direction. The pump structure further comprises a linear actuator for providing a pumping action in the pump chamber to pump the fluid to flow. The pump chamber has a substrate chamber formed in the first substrate as well as a hole formed in the second substrate to free the flexible intermediate interlayer to act as a pump interlayer diaphragm. The linear actuator moves in the hole to bend the pump interlayer diaphragm and therefore provide a necessary force to provide a pumping action in the pump chamber to pump the fluid to flow. The fluid flow controlling structure comprises a passive check valve positioned before the pump chamber and a passive check valve positioned after the pump chamber. Each of these passive check valves provide a lower resistance to a fluid to flow in the first direction and a higher resistance to a fluid to flow in a second direction. In some embodiments, each of the two passive check valves comprise a first substrate channel and a second substrate channel separated by the flexible intermediate interlayer with through holes formed in the flexible intermediate interlayer that are contained within the first substrate channel but not within said second substrate channel.

BRIEF DESCRIPTION OF THE DRAWINGS

FIGS. 12A and 12B illustrate cross-sectional views of a pull type microfluidic device in accordance with an embodiment of the present invention.

Like reference numerals refer to corresponding parts throughout the several views of the drawings.

DETAILED DESCRIPTION OF THE INVENTION

Figure 1A:
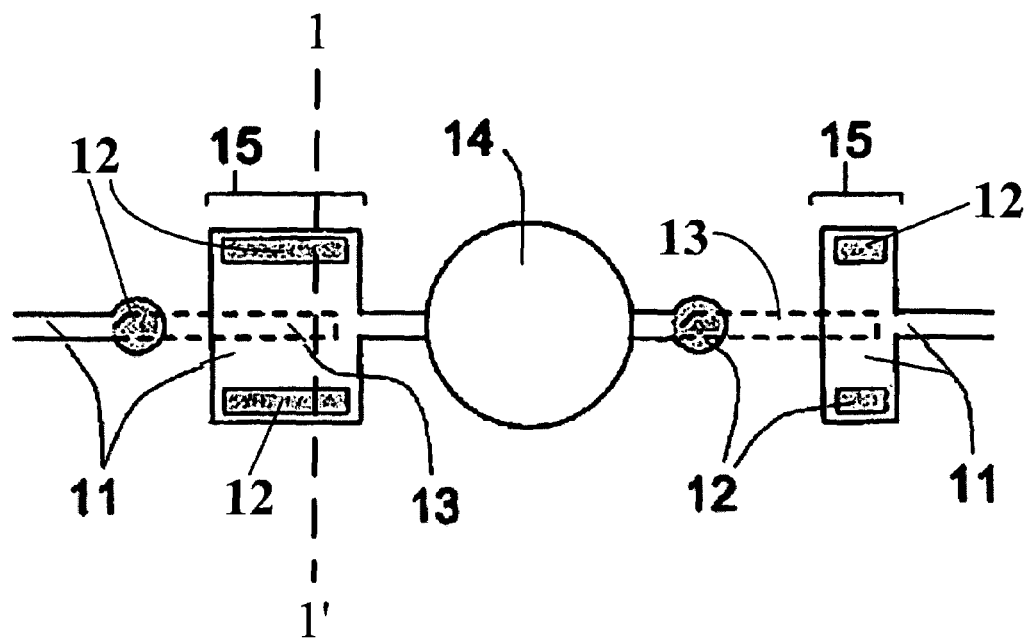
FIG. 1A is a top view of a pump structure within a plastic fluidic device in accordance with one embodiment of the present invention.
Figure 1B:
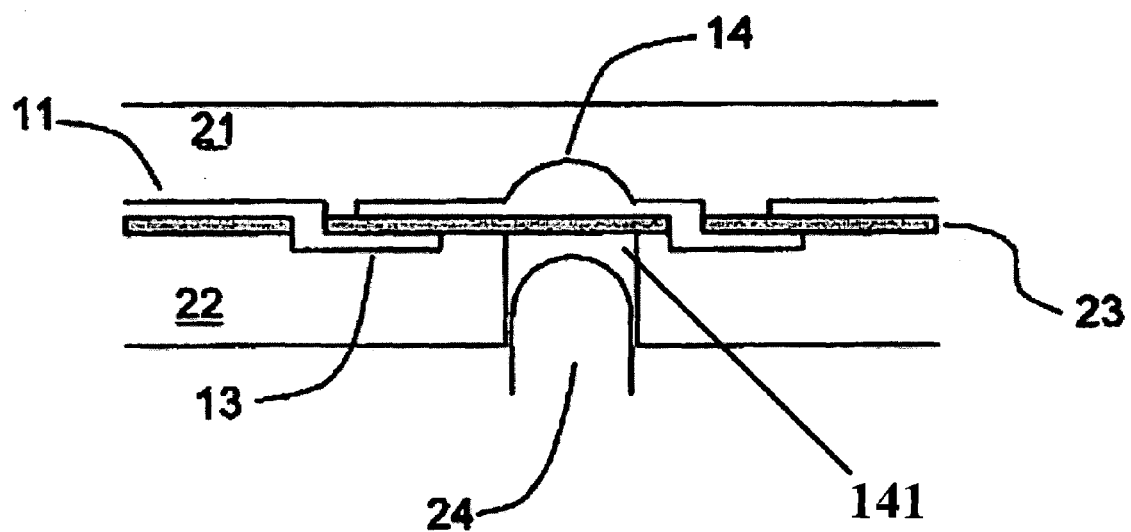
FIG. 1B is a cross sectional view of the pump structure within a plastic fluidic device in accordance with one embodiment of the present invention.

A system in accordance with one aspect of the invention comprises a plastic fluidic cartridge and a linear actuator system external to the fluidic cartridge. FIG. 1A shows a top view of a pump structure formed within the fluidic cartridge of the invention. The plastic fluidic cartridge is composed of three primary layers: an upper substrate 21, a lower substrate 22, and a flexible intermediate interlayer 23, as shown in FIG. 1B. The three layers can be assembled by various plastic assembly methods such as, for example, screw assembly, heat staking, ultrasonic bonding, clamping, or suitable reactive/adhesive bonding methods. The upper and lower substrates 21, 22 both contain a variety of features that define channels of capillary dimensions as well as pump chambers, valve chambers, reaction chambers, reservoirs, and inlet/outlet ports within the cartridge.

FIG. 1B shows a cross-sectional view of the pump structure of FIG. 1A. The pump is defined by a pump chamber 14 and two passive check valves 15 that provide a high resistance to flow in one direction only. Referring to FIG. 1B, each passive check valve 15 comprises a lower substrate channel 13 and an upper substrate channel 11 separated by interlayer 23 such that holes 12 through interlayer 23 are contained within upper substrate channel 11 but not within lower substrate channel 13. Such check valve structures 15 provide a low resistance to a gas/liquid flowing from a lower substrate channel 13 to an upper substrate channel 11 and likewise provide a high resistance to a gas/liquid flowing from upper substrate channel 11 to the lower substrate channel 13 within a check valve 15.

Figure 1C:
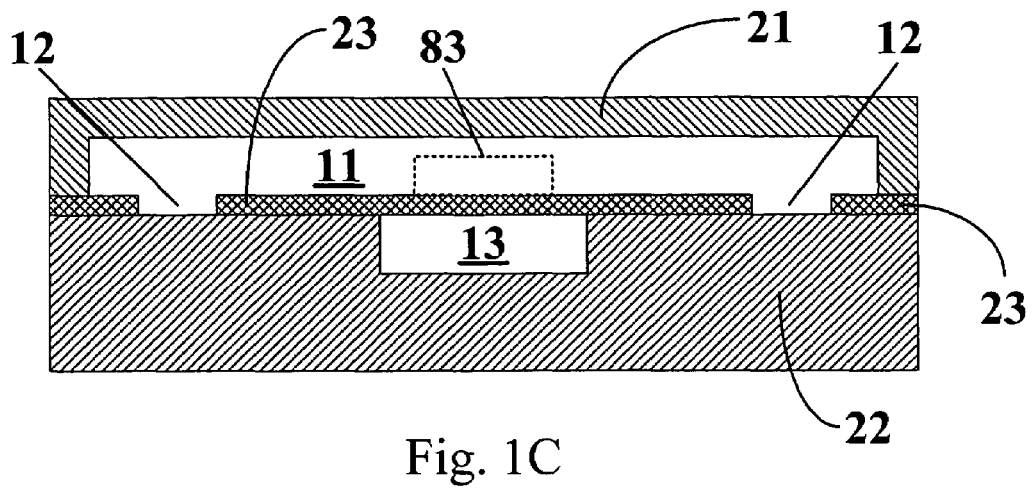
FIG. 1C is a cross sectional view of the pump structure within a plastic fluidic device in accordance with one embodiment of the present invention.
Figure 1D:
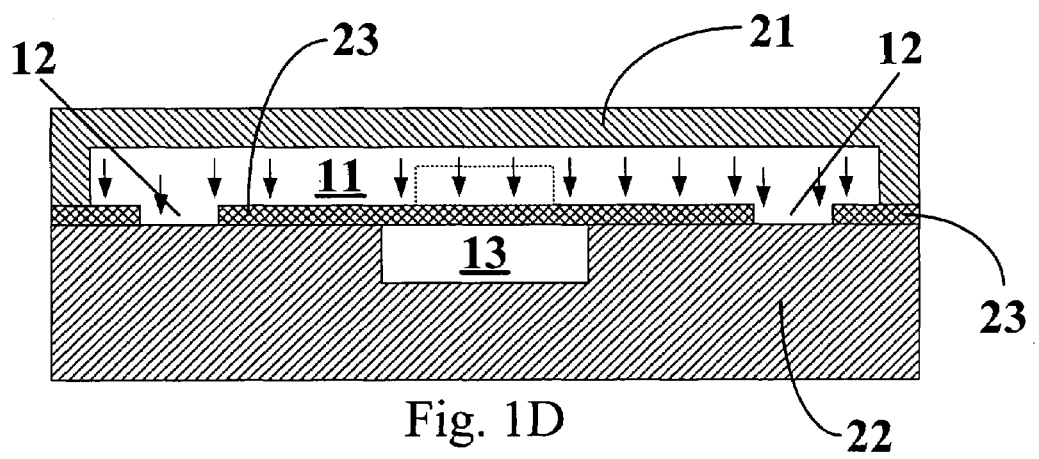
FIG. 1D is a cross sectional view of the pump structure within a plastic fluidic device when liquid/gas enters a check valve structure via an upper substrate channel in accordance with one embodiment of the present invention.
Figure 1E:
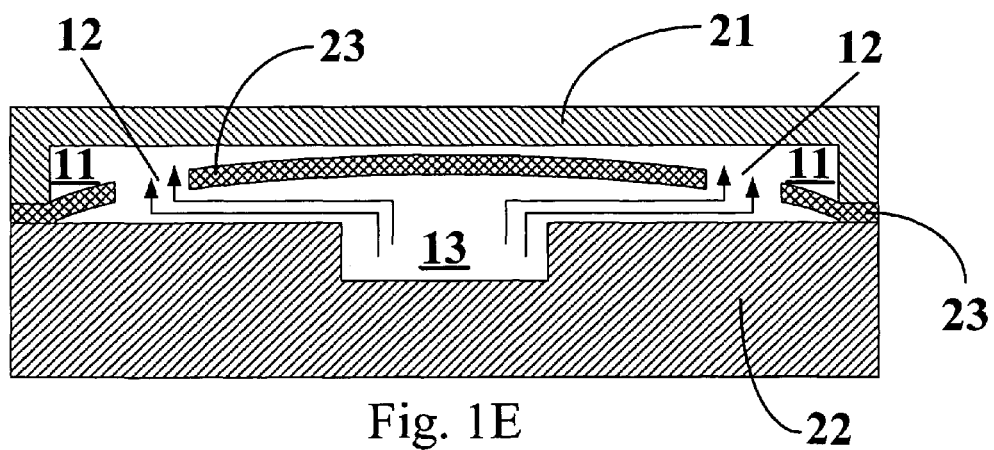
FIG. 1E is a cross sectional view of the pump structure within a plastic fluidic device when liquid/gas enters a check valve structure via a lower substrate channel in accordance with one embodiment of the present invention.

FIGS. 1C–1E illustrate how a check valve structure 15 provides a low resistance to a gas/liquid flowing from lower substrate channel 13 to upper substrate channel 11 yet resists flow in the reverse direction. FIG. 1C depicts a cross-sectional view of check valve 15 taken through line 1–1' of FIG. 1A. Depicted in FIG. 1C is lower substrate 22, upper substrate 21, and flexible intermediate interlayer 23. Also depicted in FIG. 1C is lower substrate channel 13 which, in FIG. 1A is a dashed box that enters passive check valve 15 from the left. As drawn in FIG. 1C, flexible intermediate interlayer 23 seals lower substrate channel 13. Flexible intermediate interlayer 23 includes two holes 12 that are open to upper substrate channel 11 but not lower substrate channel 13. Dashed line 83 in FIG. 1C illustrates the profile of upper substrate channel 11 as it exits from check valve structure 15 (on the right hand side of structure 15 as drawn in FIG. 1A). FIG. 1D illustrates what happens when liquid/gas enters check valve structure 15 via upper substrate channel 11. Such liquid/gas pushes down on flexible intermediate layer 23. Thus, even though there are holes (holes 12) in flexible intermediate layer 23, they don't line up with lower substrate channel 13 and thus liquid/gas cannot traverse through holes 12 from upper substrate channel 11 to lower substrate channel 13. In FIG. 1E, in contrasts, illustrates what happens when liquid/gas enters check valve structure via lower substrate channel 13. Such liquid/gas pushes up on flexible intermediate layer 23 causing fluid communication between lower substrate channel 13 and upper substrate channel 11 as depicted in FIG. 1E. Because of this fluid communication, liquid/gas can enter passive check valve 15 via lower substrate channel 13, pass through holes 12 in flexible intermediate layer 23 and exit passive check valve 15 via upper substrate channel 11.

Referring to FIG. 1B, pump chamber 14 has an upper substrate chamber and a hole 141 in lower substrate 22 to free flexible intermediate layer 23 to act as a diaphragm. A linear actuator 24, external to the fluidic cartridge, can then be placed in hole 141 to bend flexible intermediate layer 23 and therefore provide the necessary force to deform flexible intermediate layer 23 to provide pumping action to fluids within the device.

Figure 2:
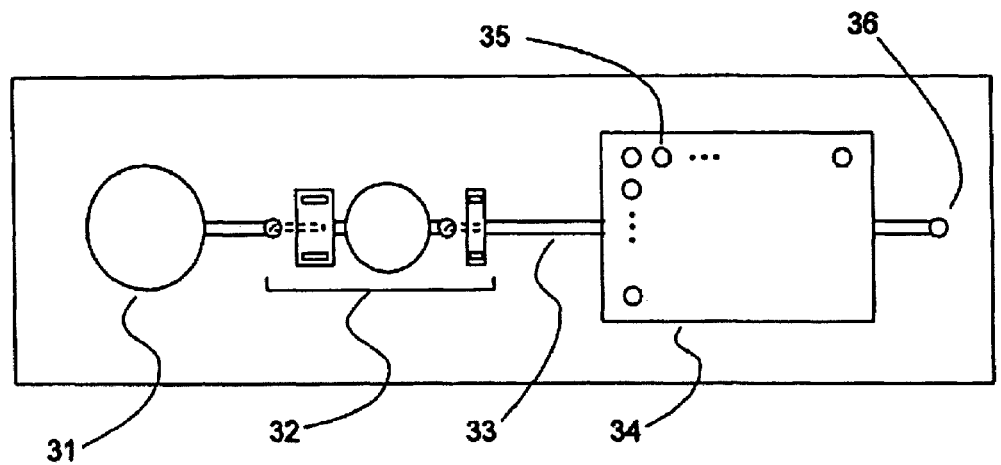
FIG. 2 is a top view of a plastic fluidic device configured as a single-fluid delivery and analysis device in accordance with one embodiment of the present invention.

FIG. 2 shows a top view of a plastic fluidic cartridge of one embodiment of the invention configured as a single-fluid delivery and analysis device. Fluid is first placed into reservoir 31 manually or on an automated basis using a pipette or similar apparatus. A pump structure 32 similar to that of FIG. 1 is contained within the device illustrated in FIG. 2. By repeatedly actuating an external linear actuator (not shown), fluid in reservoir 31 is pumped through pump structure 32, the capillary channel 33 and into reaction chamber 34. Reaction chamber 34 contains a plurality of immobilized biomolecules 35 for specific solid-phase reactions with the fluid. After a specified reaction time, fluid is pumped through reaction chamber 34 and out exit port 36.

Upper and lower substrates 21, 22 of the plastic fluidic cartridge of the invention can be constructed using a variety of commercially available materials such as, for example, polymethyl-methacrylate (PMMA), polystyrene (PS), polycarbonate (PC), polypropylene (PP), or polyvinylchloride (PVC). Other representative materials that can be used to fabricate upper and lower substrates 21, 22 include, but are not limited to polychlorotrifluoroethylene (PCTFE), polyetheretherketone (PEEK), polyetherimide (PEI), polyethersulfone (PES), polyethylene—carbon filled (PE), polyethylene—high density (HDPE), polyethylene—low Density (LDPE), polyethylene—U.H.M.W. (UHMW PE), polyethylene naphthalate (PEN), polyethylene terephthalate (polyester, PET, PETP), polyethylene/polyethylene composite (PE fibre—PE matrix), polyhydroxybutyrate—biopolymer (PHB), polyhydroxybutyrate/polyhydroxyvalerate 8%—biopolymer (PHB92/PHV 8), polyhydroxybutyrate/polyhydroxyvalerate 12%—biopolymer (PHB88/PHV12), polyimide (PI), polymethylpentene (TPX®), polyoxymethylene—copolymer (acetal—copolymer POMC), polyoxymethylene—homopolymer (acetal—homopolymer POMH), polyoxymethylene/acetal copolymer—10% carbon fiber reinforced (POMC—10% CFR), polyphenyleneoxide (PPO modified, PPE modified), polyphenyleneoxide (modified), polyphenylenesulfide (PPS), polyphenylenesulfide—40% glass fiber reinforced (PPS—40% GFR), polyphenylenesulphide—20% carbon fiber reinforced (PPS—20% CFR), polyphenylsulfone (PPSu), polypropylene (PP), polypropylene—polypropylene composite (PP fibre—PP matrix), polystyrene (PS), polystyrene—conductive (High Impact Conductive Polystyrene), polystyrene—cross-linked (PS—X-Linked), polystyrol, polysulphone (PSu), polytetrafluoroethylene (PTFE), polytetrafluoroethylene coated Glass Fabric (PTFE 75/Glass 25), polytetrafluoroethylene filled with glass (PTFE 25% GF), polyvinylchloride—unplasticized (UPVC), polyvinylfluoride (PVF), polyvinylidenechloride (PVDC), and polyvinylidenefluoride (PVDF). See, for example, product catalogs offered by Goodfellow Cambridge Limited, Huntingdon, Cambridgeshire, England. In the case of optical characterization of reaction results within reaction chamber 34, upper substrate 21 is preferably constructed out of a transparent plastic material. Capillaries, reaction chambers, and pump chambers can be formed in substrates 21, 22 using methods such as injection molding, compression molding, hot embossing, machining, microcompression molding, electrodischarge machining, injection compression molding, hot stamping, and micro injection molding. Thicknesses of upper and lower substrates 21, 22 are suitably in, but not limited to, the range of 1 millimeter to 3 millimeters. Flexible interlayer 23 can be made of a variety of polymer and rubber materials including, but not limited to natural rubber, latex, silicone elastomers, polyvinyl chloride (PVC), polyvinylidene chloride (PVDC), fluoroelastomers, or urethane thermoplastic elastomers. Methods for forming the features in the interlayer 23, such as holes 12, include die cutting, die forging, blow molding, rotary die cutting, laser etching, injection molding, and reaction injection molding.

The linear actuator 24 of the present invention is preferred to be, but not limited to, an electromagnetic solenoid. Other suitable linear actuators include induction motors, magnetic actuators, thermal actuators, chemical and electrochemical actuators, a motor/cam/piston configuration, a piezoelectric linear actuator, or a motor/linear gear configuration. Exemplary actuators that can be used as a linear actuator 24 are described in Madou, *Fundamentals of Microfabrication—The Science of Miniaturization*, Second Edition, CRC Press, New York, 2002, pp. 547–600, which is hereby incorporated by reference in its entirety.

The invention will further be described in a series of case studies that describe different configurations for performing different analyses using the plastic fluidic cartridge and external linear actuator of this invention.

Case study—Immunological Assay. The plastic fluidic cartridge, as shown in FIG. 2, can be utilized to perform immunological assays within reaction chamber 34 by immobilizing a plurality of biomolecules such as different antibodies 35. First, a sample containing an unknown concentration of a plurality of antigens or antibodies is placed within reservoir 31. External linear actuator 24 is then repeatedly actuated to pump the sample from reservoir 31 to reaction chamber 34. The sample is then allowed to react with immobilized antibodies 35 for a set time. At the set reaction time, the sample is then excluded from reaction chamber 34 through exit port 36. A wash buffer is then placed in reservoir 31 and external linear actuator 24 is repeatedly actuated to pump wash buffer through reaction chamber 34 and out exit port 36. Such wash steps can be repeated as necessary. A solution containing a specific secondary antibody conjugated with a detectable molecule such as a peroxidase enzyme, alkaline phosphatase enzyme, or fluorescent tag is placed into reservoir 31. The secondary antibody solution is then pumped into reaction chamber 34 by repeatedly actuating linear actuator 24. After a predetermined reaction time, the solution is pumped out through exit port 36. Reaction chamber 34 is then washed in a similar manner as previously described. In the case of an enzyme conjugate, a substrate solution is placed into reservoir 31 and pumped into reaction chamber 34. The substrate will then react with any enzyme captured by the previous reactions with immobilized antibodies 35 providing a detectable signal. For improved assay performance reaction chamber 34 can be maintained at a constant temperature such as 37° C.

Figure 3:
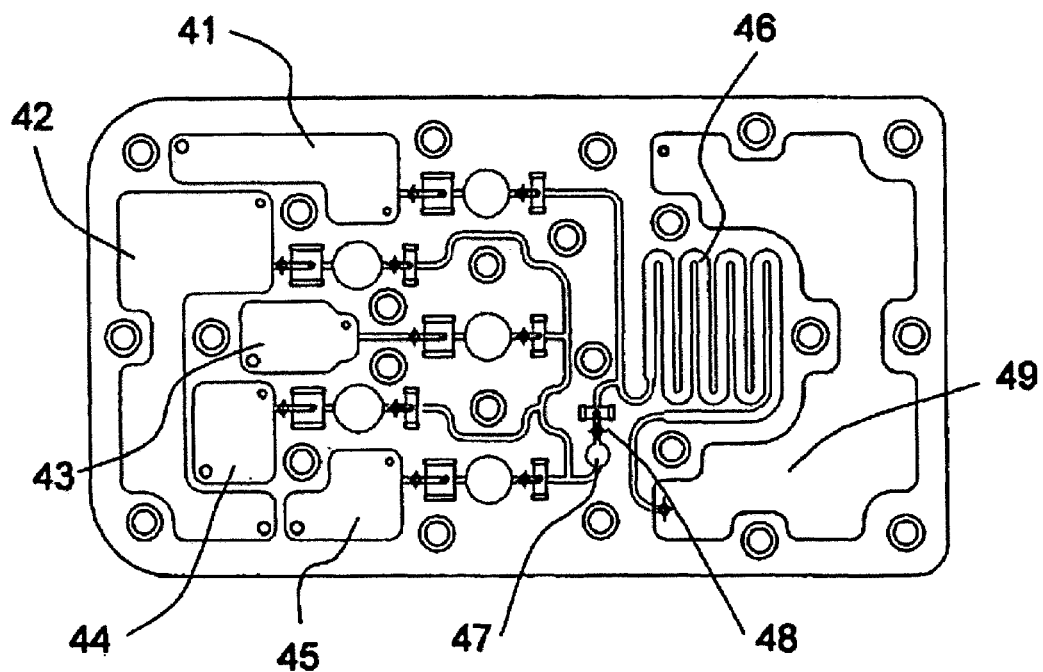
FIG. 3 is a top view of a plastic fluidic device configured as a five fluid delivery and analysis device, in accordance with one aspect of the present invention.

Multi-fluid delivery and analysis device. According to an embodiment of the present invention, the plastic fluidic cartridge need not be configured as the single-fluid delivery and analysis device illustrated in FIG. 2. For example, FIG. 3 shows a plastic cartridge configured as a five fluid delivery and analysis device. Such a device can perform immunological assays, such as competitive immunoassays, immunosorbent immunoassays, immunometric immunoassays, sandwich immunoassays and indirect immunoassays by providing immobilized antigens or antibodies in reaction chamber 46. In FIG. 3, reaction chamber 46 is not configured as a wide rectangular area, as was the case for reaction chamber 34 of FIG. 2, but rather as a serpentine channel of dimensions similar to the capillary dimensions described above. The configuration depicted in FIG. 3 provides more uniform flow through reaction chamber 46. To perform immunoassays, a sample containing unknown concentrations of a plurality of antigens or antibodies is placed in reservoir 41. A wash buffer is placed in reservoir 42. Reservoir 43 remains empty to provide air purging. A substrate solution specific to the secondary antibody conjugate is placed in reservoir 44. The secondary antibody conjugate is placed in reservoir 45. Each reservoir is connected to a pump structure identical to or similar to the one depicted in FIG. 1 in order to provide pumping from the connected reservoirs 41, 42, 43, 44, and 45 through reaction chamber 46 to waste reservoir 49. A secondary reaction chamber 47 is provided for negative control and is isolated from the sample of reservoir 41 by check valve 48. The protocol for performing immunoassays in this device is equivalent to that described previously for the single-fluid configuration with the distinct difference that each separated reagent is contained in a separate reservoir and pumped with a separate pump structure using a separate external linear actuator. First, the external linear actuator corresponding to the pump connected to reservoir 41 is repeatedly actuated until the sample fills reaction chamber 46. After a predetermined reaction time, the sample is pumped to waste reservoir 49 using either the pump connected to the sample reservoir 41 or the pump connected to the air purge reservoir 43. Next the wash buffer is pumped into reaction chamber 46 by repeatedly actuating the external actuator corresponding to the pump structure connected to wash reservoir 42. The wash cycle and air purge can be repeated as necessary. The secondary antibody is then pumped into reaction chamber 46 by repeatedly actuating the external linear actuator corresponding to the pump structure connected to reservoir 45. After a predetermined reaction time the secondary antibody is excluded from reaction chamber 46 either by the pump connected to reservoir 45 or the pump connected to the air purge reservoir 43. Reaction chamber 46 is then washed as before. The substrate is then pumped into reaction chamber 46 by repeatedly actuating the linear actuator corresponding to the pump connected to reservoir 44. After a predetermined reaction time, the substrate is excluded from the reaction chamber and replaced with wash buffer from reservoir 42. Results of the immunoassay can then be confirmed by optical measurements through the upper substrate.

FIG. 2 illustrates a single reservoir microfluidic device whereas FIG. 3 illustrates a five reservoir microfluidic device. However, the present invention is not limited to such embodiments. In fact, any number of reservoirs and associated pumps can be implemented in the microfluidic devices of the present invention, including one reservoir (FIG. 2), two reservoirs, three reservoirs, four reservoirs, five reservoirs (FIG. 3), or more than five reservoirs.

Figure 4:
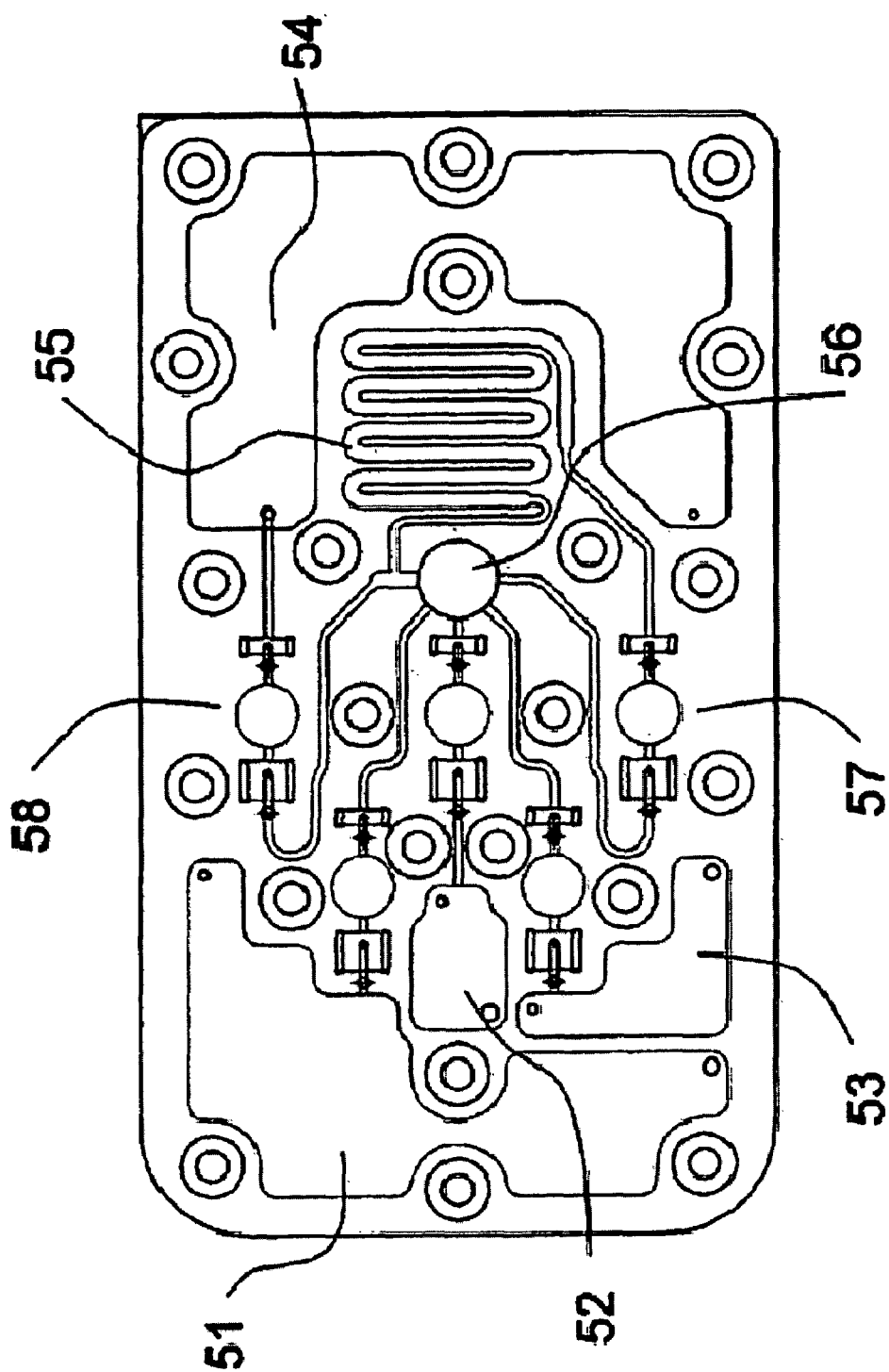
FIG. 4 is a top view of a plastic fluidic device configured as a recirculating fluid delivery and analysis device in accordance with one aspect of the present invention.

Furthermore, the reactions performed with the plastic fluidic cartridge of the invention need not be limited to reactions performed in stationary liquids. FIG. 4 shows a plastic fluidic cartridge according to the invention configured to provide continuous fluid motion through reaction chamber 55. In this configuration, reservoirs 51, 52, and 53 are connected to separate pump structures similar to the five fluid configuration of FIG. 3, but in this case the reservoirs are connected to an intermediate circulation reservoir 56 (open reservoir). Flow out of intermediate circulation reservoir 56 is regulated by pump structure 57. Pump structure 57 has the same architecture depicted in FIG. 1. The fluid communication between pump structure 57 and circulation reservoir 56 provides continuous circulation of fluid from intermediate circulation reservoir 56 through reaction chamber 55 with a return to circulation reservoir 56. The microfluidic device depicted in FIG. 4 of a "push type" recirculating device because pump 57 pushes fluid from intermediate circulation reservoir 56 into reaction chamber 55. Accordingly, fluid can be continuously circulated through reaction chamber 55 without interuption. Such a fluid motion can provide better mixing, faster reactions times, and complete sample reaction with immobilized species in reaction chamber 55. At the end of the reaction, fluid can be drained from intermediate circulation reservoir 56 into waste reservoir. This is accomplished by activating pump structure 58, which has the same architecture as the pump depicted in FIG. 1. Pump structure 58 is connected to intermediate circulation reservoir 56 such that it provides pumping of fluids from intermediate circulation reservoir 56 to waste reservoir 54 (waste chamber). Immnunological assays similar to those described above can be performed in this device by immobilizing antibodies in reaction chamber 55.

To summarize the features of the microfluidic of FIG. 4, a microfluidic device with embedded unidirectional pumps and valves is provided that incorporates continuous circulation of reactants. Again referring to FIG. 4, a single pump 57 is capable of circulating reagents between a solid-phase reaction chamber 55 and an intermediate open reservoir 56. Intermediate open reservoir 56 facilitates sample and reagent introduction, allows for air removal, and enhances homogeneity of solutions. Another pump, pump 58, is incorporated on the device to empty reaction chamber 55 and intermediate open reservoir 56 in the case of multi-step reactions. Waste fluids can be stored on the device in waste chamber 54 or pumped off the device into a waste tank. Waste storage on the device is advantageous for containment of potentially infectious samples. Precise loading of reagents is not necessary, but at least enough solution to fill intermediate open reservoir 56 is recommended to remove all gases within reaction chamber 55.

One protocol for the use of the device in FIG. 4 is as follows. A sample containing unknown concentrations of antigens or antibodies is placed in intermediate circulation reservoir (open reservoir) 56. A solution of secondary antibody conjugate is placed in reservoir 52. A substrate solution is placed in reservoir 53 and a wash buffer is placed in reservoir 51. The remaining protocol is identical to the above method with the addition of transferring fluids to and from circulation reservoir 56 and continuous circulation during all reaction times.

Case study—DNA Hybridization. Among other applications, the device depicted in FIG. 4 can be used to perform DNA hybridization analysis. Using the device of FIG. 4, a plurality of DNA probes are immobilized in reaction chamber 55. A sample containing one or more populations of fluorescently tagged, amplified DNA of unknown sequence is placed in reservoir 52. A first stringency wash buffer is placed in reservoir 51. A second stringency wash buffer is placed in reservoir 53. Reaction chamber 55 is maintained at a constant temperature of 52° C. The sample is transferred from reservoir 52 to intermediate circulation reservoir 56 by repeatedly actuating the linear actuator corresponding to the pump structure connected to reservoir 52. The sample is then circulated through reaction chamber 55 by repeatedly actuating the linear actuator corresponding to pump structure 57. The sample is circulated continuously through intermediate circulation reservoir 56 and reaction chamber 55 for a predetermined hybridization time, typically between 30 minutes and two hours. The sample is then excluded from circulation reservoir 56 and reaction chamber 55 by actuating pump structures 57 and 58 in opposing fashion. The first stringency wash is then transferred to circulation reservoir 56 by repeatedly actuating the linear actuator corresponding to the pump structure connected to reservoir 51. The buffer is then circulated through reaction chamber 55 in the same manner described above. After a predetermined wash time the buffer is excluded from reaction chamber 55 and intermediate circulation reservoir 56 as described above. A second stringency wash buffer is then transferred to intermediate circulation reservoir 56 and circulated through reaction chamber 55 similar to way previously described for the first stringency wash buffer. After exclusion of the second wash buffer the DNA hybridization results can be read by spectroscopic means such as fluorescent imaging.

A push type microfluidic device that provides continuous flow of reactants in a circulatory manner by transferring reagents between an intermediate circulation reservoir and a reaction chamber has been described in conjunction with FIG. 4, above. Using such a device, entire sample volumes are continuously circulated using only one pump without the need for precise sample quantities. Kinetic reactions performed in such a manner have two distinct advantages over their static counterparts. First, reaction rates are enhanced since reactants only need to diffuse through a very thin layer near the reactive surface. Second, reactions are no longer limited by scarce reactant molecules, but can proceed until the reactive surface is saturated.

Initial studies show that for single step immunological reactions, reaction rates can be increased fourfold compared to static reactions under similar conditions. In the case of two step reactions, four to sixteen fold increases are expected. For example, while not intending to be limited to any particular theory, immunoaffinity reactions occurring on a solid phase can be modeled using a simple second order chemical reaction with diffusion occurring in the liquid phase. If immediate and irreversable binding is assumed, reaction rates are limited by the rate of the liquid born reactant diffusing to the reactive surface. In this case, diffusion limited second order reaction kinetics in the absence of mixing is given as:

$$dB_t/dt = [(A-B_t)/A][(C-B_t)/V][S(kD/\pi)^{1/2}t^{-1/2}] \quad (1)$$

where:

$B_t$=number of bound molecules at time t;

t=elapsed adsorption time (hr);

A=number of molecules that can be bound;

C=initial number of molecules in solution;

V=liquid volume (cm$^3$);

S=adsorbing surface area (cm$^2$);

D=diffusion constant (IgG=1.44×10$^{-3}$ cm$^2$hr$^{-1}$); and k=dimensionless coefficient to be fit to experimental data.

See, for example, Esser, 1988, "Principles in adsorption to polystyrene," Nunc Bulletin No. 6, 1–5, second edition 1996; Esser, 1992, "The surface/volume ratio in solid phase assays," Nunc Bulletin No. 10, 3–6, second edition 1996; Atkins, *Physical Chemistry*, 4$^{th}$ edition, Oxford Press, pp. 785–789; and Davies and Rideal, *Interfacial Phenomena*, Academic Press, 1963, pp 165–167, each of which is hereby incorporate by reference in its entirety.

It can be seen from equation (1) that the reaction rate will reduce to zero as $B_t$ approaches the lesser of A or C. Typically, in most immunoassays, A is much greater than C. Integration of equation (1) generates a function $B_t(t^{1/2})$ where $t^{1/2}$ is the square root of the reaction time. In the absence of saturation, $B_t(t^{1/2})$ will approximately be proportional to $t^{1/2}$ (derivation not shown).

In the presence of active mixing, however, the reaction kinetics becomes:

$$dB_t/dt = [(A-B_t)/A][C/V][S(D/\delta x)] \quad (2)$$

where:

$\delta x$=thickness of the diffusion layer near the surface (cm).

See, for example, Davies and Rideal, *Interfacial Phenomena*, Academic Press, 1963, pp 165–167, which is hereby incorporate by reference in its entirety. Integrating equation (2) over time yields:

$$B_t(t) = A[1 - e^{-(CS/AV)(D/\delta x)t}] \quad (3)$$

For small values of the exponent, $B_t(t)$ can be approximated as:

$$B_t(t) \approx (CS/V)(D/\delta x)t \quad (4)$$

Therefore, prior to saturation of the reactive surface, reactions proceed at a rate that is proportional to time rather than one that is proportional to the square root of time as in the static case.

In order to achieve the favorable reaction kinetics of an actively mixed reaction, circulation can be achieved using the push device of FIG. 4 in which pump 57 pushed reactants into reaction chamber 55. Another example of a recirculating push type reactor is microdevice 502 illustrated in FIG. 5A. Device 502 includes an open reservoir 510 for introducing reactants or air. Open reservoir is in fluid communication with reaction chamber 520 via unidirectional pump 506. Pump 506 has the same architecture as the pump depicted in FIG. 1. Pump 506 pushes reactants from open reservoir 510 into reaction chamber 520. Then, reactants drain back into open reservoir 510. This push type recirculation continues as long as pump 506 is actuated. At the end of a predetermined reaction period (e.g., between 30 minutes and two hours), unidirectional pump 504 is activated thereby draining fluid/gases into waste reservoir 530. Pump 504 has the same architecture as the pump illustrated in FIG. 1.

Figure 5B:
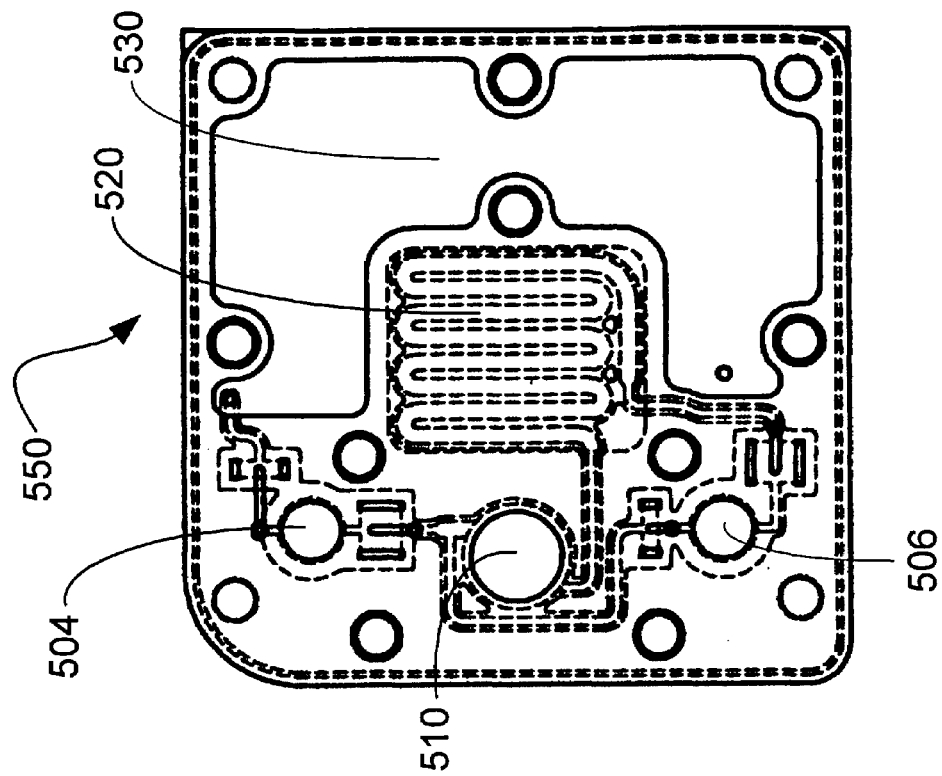
FIG. 5B is a top view of a pull type recirculating microfluidic device in accordance with one embodiment of the present invention.
Figure 5A:
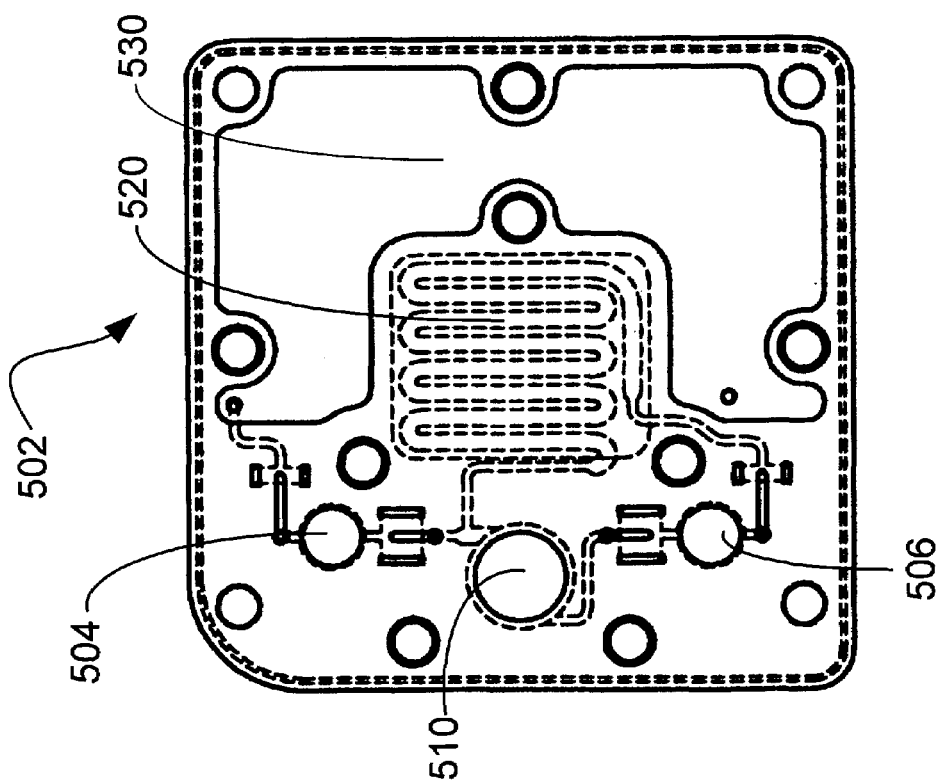
FIG. 5A is a top view of a push type recirculating microfluidic device in accordance with one embodiment of the present invention.

An example of another type of recirculating microdevice is the pull type reactor 550 illustrated in FIG. 5B. In device 550, rather than pushing solution into reaction chamber 530, pump 506 pulls fluid from reaction chamber 520 and into open reservoir 510. Thus, flow from open reservoir 510 into reaction chamber 520 when pump 506 is activated. Pump 506 acts to return fluids/gases from reaction chamber 520 back into open reservoir 510. This pull type recirculation continues as long as pump 506 is actuated. At the end of a predetermined reaction period (e.g., between 30 minutes and two hours), unidirectional pump 504 is activated thereby draining fluid/gases into waste reservoir 530 of device 550. As such, FIG. 5 shows the chip design for both push (FIG. 5A) and pull (FIG. 5B) type continuous recirculation devices.

Case study using pull device 550 of FIG. 5. Single step immunological reactions have been performed on device 550 (FIG. 5B) by immobilizing 50 µg/ml of rabbit IgG antibodies into reaction chamber 520. Goat anti-rabbit IgG HRP conjugate is then reacted in the device under continuous circulation for a fixed reaction time. The conjugate solution is then pumped to waste chamber 530. Reservoir 510 and reaction chamber 520 are then washed with a buffer solution. The buffer solution is then pumped into waste chamber 530 and a luminal substrate is added and pumped into reaction chamber 520. The resulting luminescence is recorded using a cooled CCD camera and quantified. Varying concentrations of conjugate stock were reacted and compared with a similar microfluidic device designed for static reaction conditions.

Figure 6B:
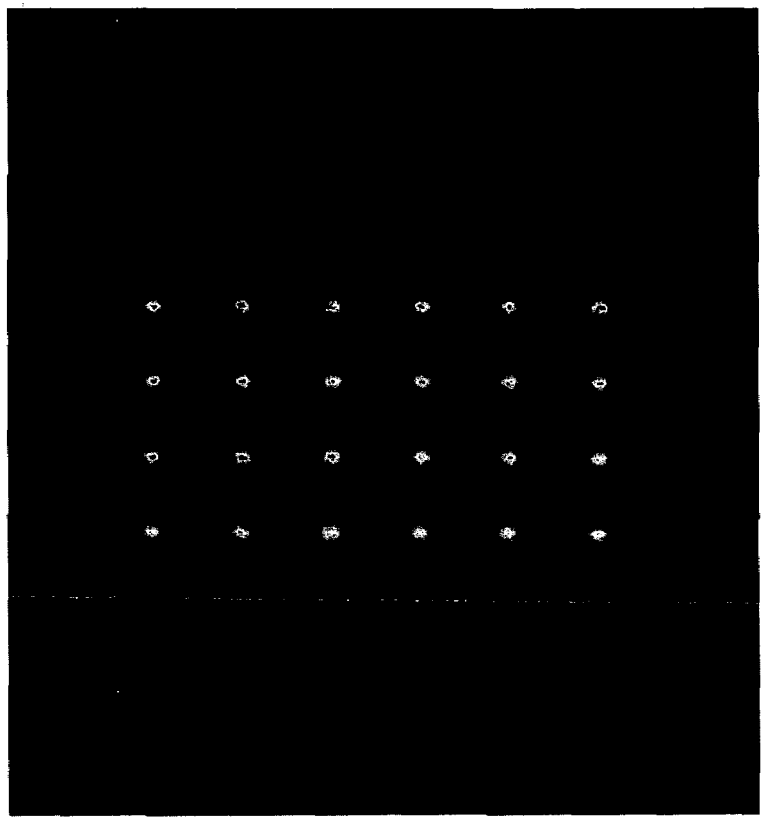
FIG. 6B is a CCD image of an immunological reaction using a static microfluidic device in accordance with the present invention.
Figure 6A:
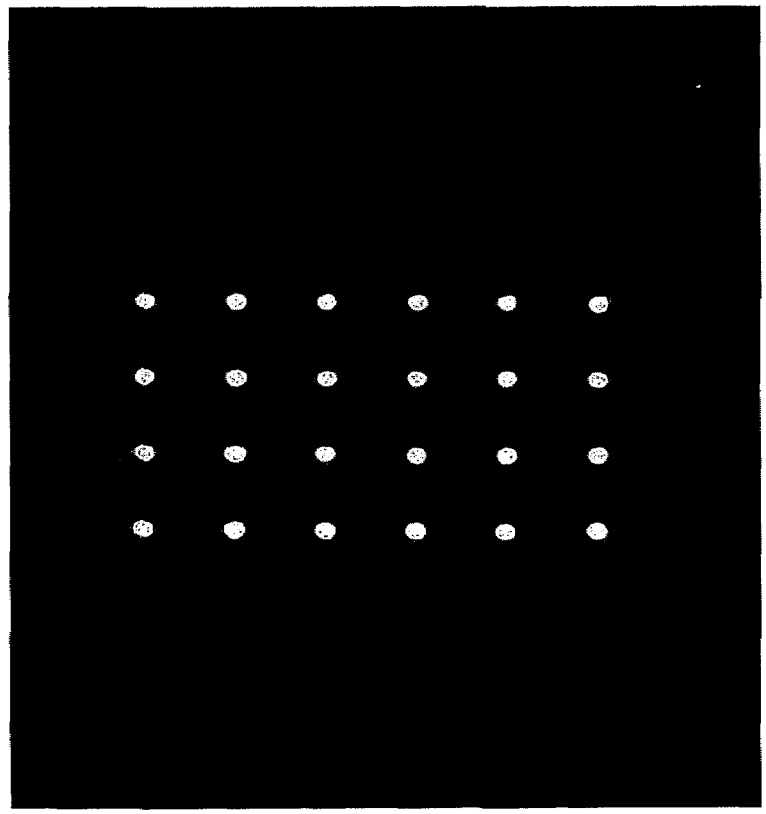
FIG. 6A is a CCD image of an immunological reaction using a circulating microfluidic device in accordance with the present invention.
Figure 7:
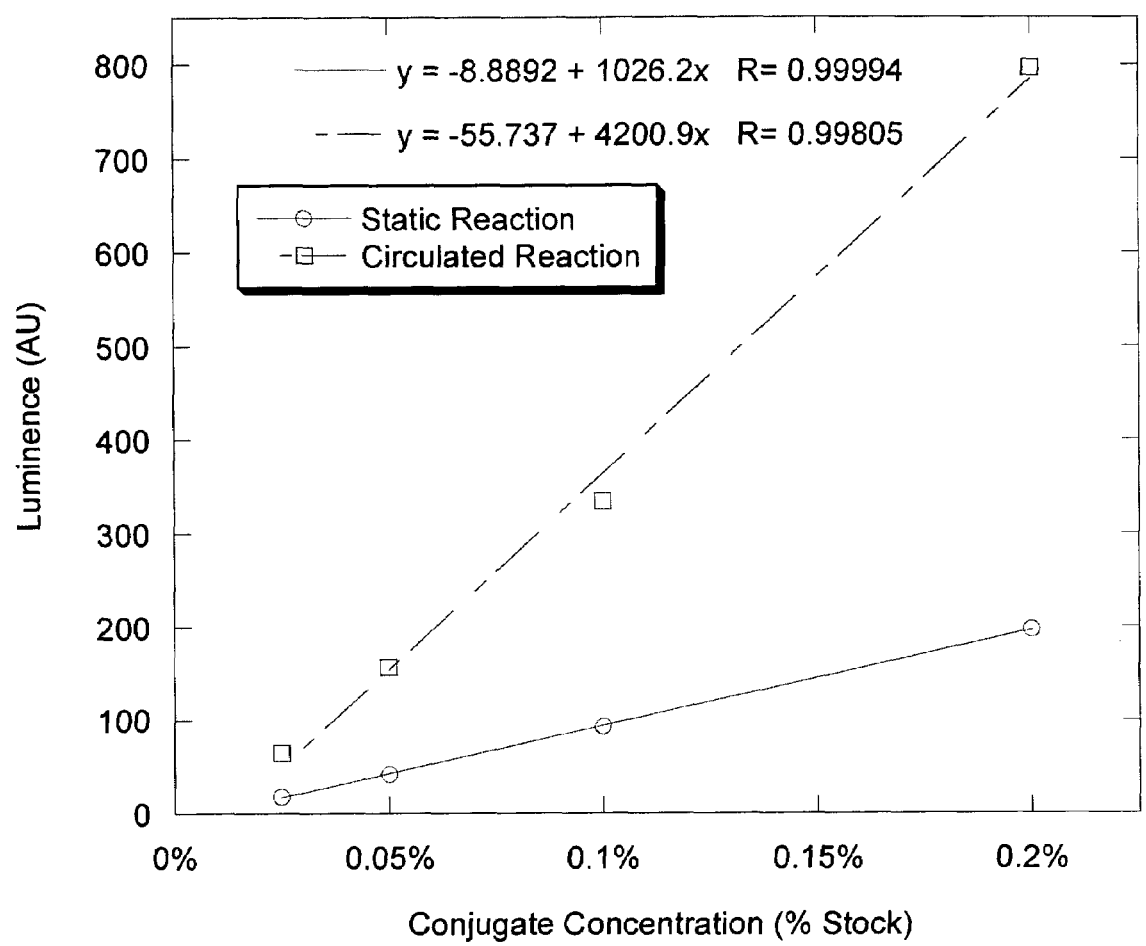
FIG. 7 illustrates luminance curves for static and circulated the one step IgG immuno-affinity reactions of FIG. 6.

FIG. 6 compares resultant CCD images from 0.2% conjugate stock concentrations for both static and circulated conditions. By analyzing the image data, a luminance curve is generated for both the static and circulation conditions as shown in FIG. 7. Comparing the slopes of the linear curve fits shows a 4.09 times enhancement in the case of circulated reactions.

The microfluidic chips described herein (e.g., FIG. 4, FIG. 5) require a linear actuator to control each pump located within the chip. Additionally, for embodiments such as that disclosed in FIGS. 4 and 5, a means of dispensing various liquids into the open reservoir is preferred. For example, in the case of the one step immunological reactions described above, conjugate, wash buffer, and substrate are typically dispensed. For two step reactions, sample, conjugate, wash buffer and substrate are typically dispensed. Dispensing can be provided as a combination of manual and automatic methods. For instance, clinical samples can be dispensed by hand and all other reagents dispensed automatically during the course of the assay. A further consideration is reaction temperature. In the case of immunological reactions, a method of providing elevated temperatures in the range of 25–55° C. is preferred. This can be accomplished, for example, by placing the microfluidic device in a controlled temperature environment such as a commercially available incubator.

As demonstrated above, the devices described in conjunction with FIG. 5 are effective in enhancing immunological reactions. Other applications employing reactions on a solid support could also benefit from such a device. Such other applications include, but are not limited to, DNA hybridization reactions, DNA sequencing, antigen detection, and high-throughput genotyping.

In the case of continuous circulation, reaction rates from equation (2) are inversely proportional to thickness of the diffusion layer, δx. Therefore reducing the thickness of the diffusion layer can result in dramatic increases in reaction rates. While not intending to be limited to any particular theory, in the microfluidic devices disclosed with respect to FIG. 5, it stands to reason that δx is a function of reaction chamber height 520 (FIG. 5). Reducing reaction chamber height 520 should also reduce δx and increase reaction rates further. Accordingly, in some embodiments, the reaction chamber height is in the range of between 10 μm and 0.5 mm. From equation (4) it is also apparent that enhancement of the diffusion coefficient by increasing the reaction temperature should be more effective in the circulation case compared with the static reaction. For instance, for immunoassays, a desired reaction temperature is in the range of between room temperature and 50° C. whereas, for DNA hybridization, a desired reaction temperature is in the range of between room temperature and 75° C.

In preferred embodiments, a pull type recirculating device such as that depicted in FIG. 5B is preferred to a push type recirculating device such as that depcited in FIG. 5A because the pull type recirculating device avoids contamination resulting from reagents splashing out and avoids producing bubbles. One such pull type recirculating device in accordance with a preferred embodiment of the present invention will now be described with reference to FIGS. 8–16.

Figure 8:
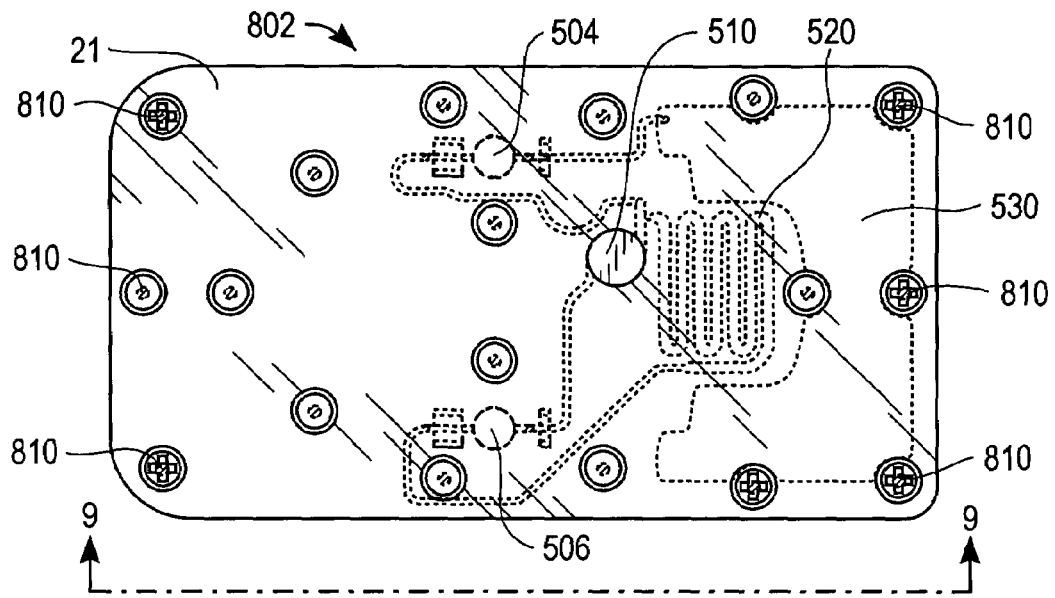
FIG. 8 illustrates a top view of a pull type microfluidic device in accordance with an embodiment of the present invention.

FIG. 8 illustrates a top view of a pull type microfluidic device 802 in accordance with an embodiment of the present invention. Microfluidic device 802 includes an upper substrate 21. Upper substrate 21 includes an opening to open reservoir 510 for introducing reactants or air into device 802. Open reservoir 510 is in fluid communication with reaction chamber 520, which, in turn, is drained by unidirectional pump 506 back into open reservoir 510. Reactants circulate between open reservoir 510 and reaction chamber 520 via unidirectional pump 506 as long as pump 506 is activated. Once a reaction is complete, reactants are drained from open reservoir and reaction chamber 520 into waste chamber 530 via unidirectional pump 504. Upper substrate 21 includes a number of features 810 for attaching upper substrate 21 to a lower substrate 22.

Figure 9:
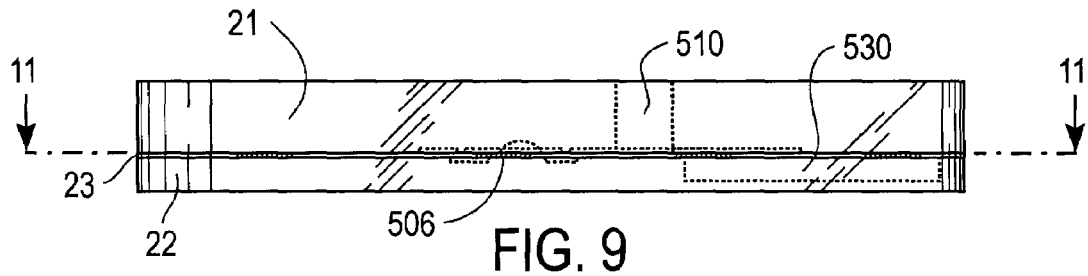
FIG. 9 illustrates a side view of a pull type microfluidic device in accordance with an embodiment of the present invention.
Figure 10:
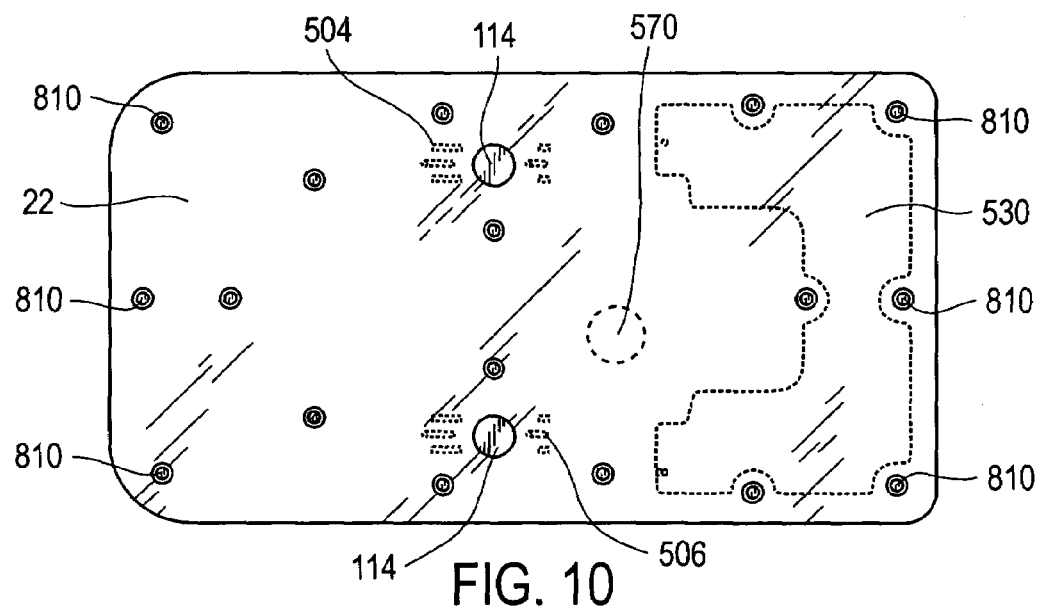
FIG. 10 illustrates a bottom view of a pull type microfluidic device in accordance with an embodiment of the present invention.

FIG. 9 is a side-sectional view of microfluidic device 802 taken from side 9—9 of FIG. 8. FIG. 9 clearly illustrates how device 802 is comprised of a lower substrate 22, a flexible intermediate interlayer 23, and an upper substrate 21. FIG. 9 further illustrates the shape of waste reservoir 530 in accordance with one embodiment of the present invention. FIG. 10 is a bottom view of device 802. FIG. 10 illustrates how lower substrate 22 includes holes 114 for the actuators of pumps 506 and 504 in addition to a number of features for attaching upper substrate 21 to lower substrate 22.

Figure 11:
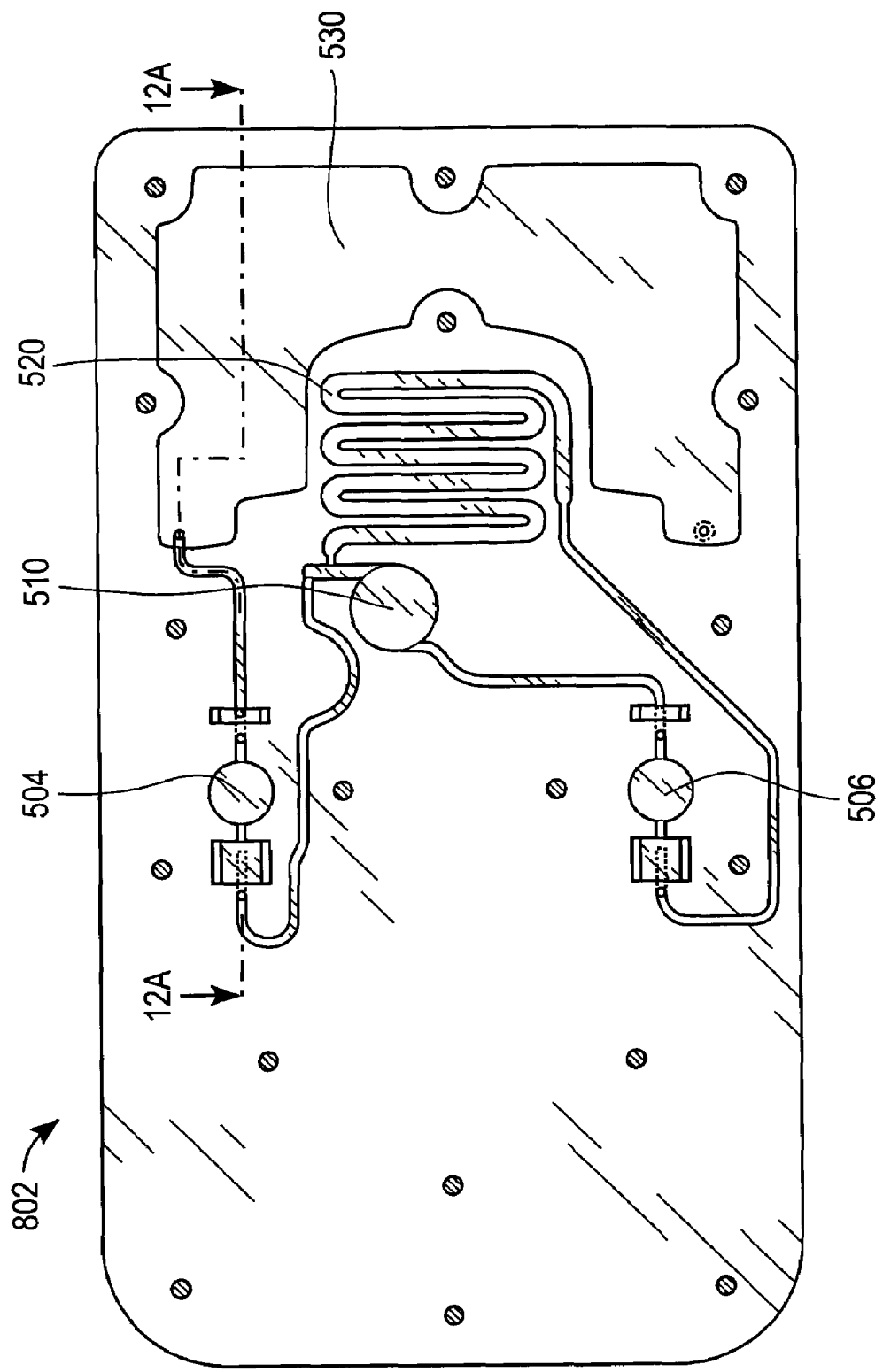
FIG. 11 illustrates a cross-sectional view of a pull type microfluidic device in accordance with an embodiment of the present invention.

FIG. 11 is a cross-sectional view of device 802 taken about line 11 of the side view of device 802 depicted in FIG. 9. Fluid and/or gases are introduced into open reservoir 510. From there, they flow into reaction chamber 520. Flow from open reservoir 510 to reaction chamber 520 is facilitated by the pulling action of unidirectional pump 506. Pump 506 has the same architecture as the pump illustrated in FIG. 1. Thus, as long as unidirectional pump 506 is activated, fluid flows from open reservoir 510, through reaction chamber 520, through unidirectional pump 506 and back to open reservoir 510. Once a reaction has completed, pump 504 is activated, causing reactants to drain from open chamber 510 and reaction reservoir 520 into waste reservoir 530. FIG. 12A provides a cross-sectional perspective view of how unidirectional pump 504 can drain open reservoir 510 and reaction chamber 520. Referring to FIG. 12A, unidirectional pump 504 causes fluid to flow and drop into waste reservoir 530. The bottom of waste reservoir 530 is below the plane of upper substrate channel 11 of pump 504. Therefore, when pump 504 causes fluid to flow to the right, in the frame of reference illustrated in FIG. 12A, fluid is drained from upper substrate channel 11 into waste reservoir 530. FIG. 12B illustrates in more detail pump 504 drawn with respect to line 12B of FIG. 12A. FIG. 12B illustrates the upper substrate channels 11 and lower substrate channels 13 of pump 504, pump chamber 14, and opening 114 that allow an external actuator to push up against flexible intermediate interlayer 23 in order to activate pump 504.

Figure 13:
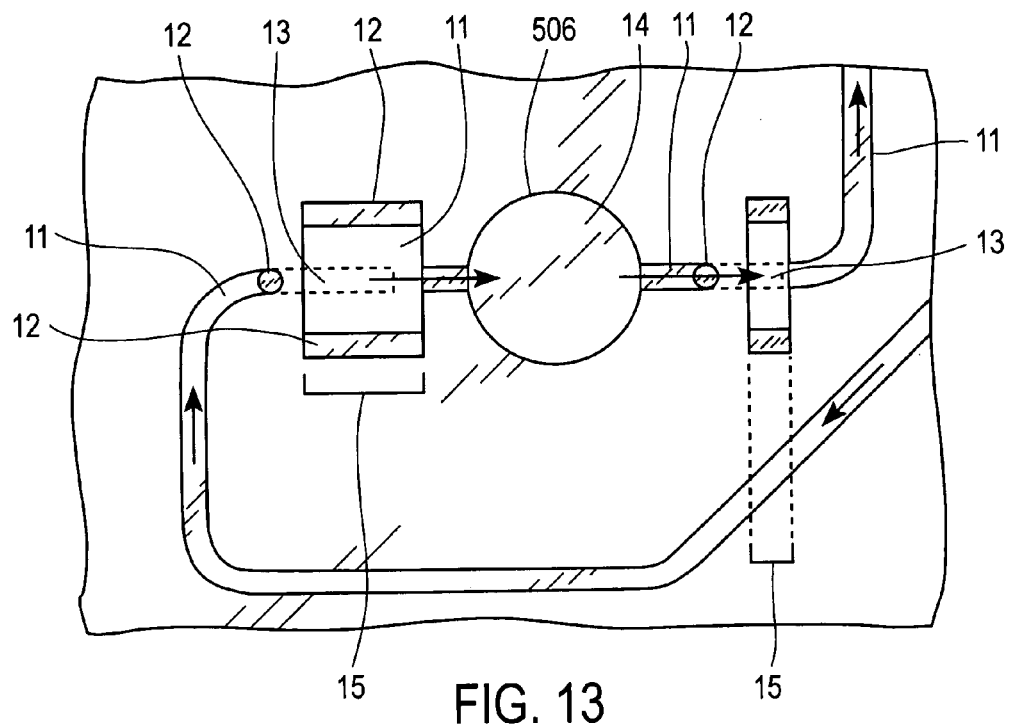
FIG. 13 illustrates top view of a pump in a pull type microfluidic device in accordance with an embodiment of the present invention.
Figure 14A:
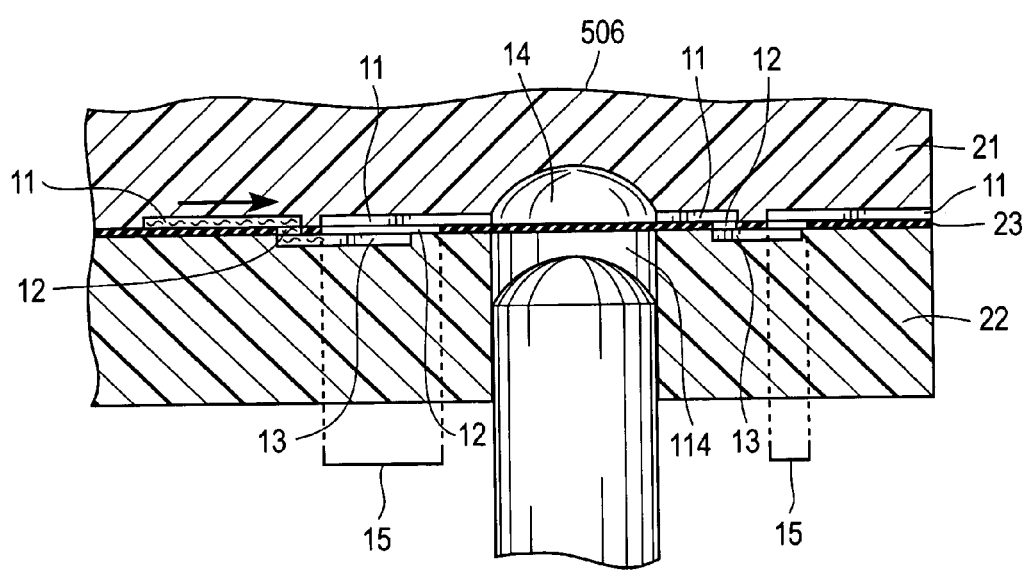
FIGS. 14A–14E illustrate cross-sectional views of a pump in a pull type microfluidic device in accordance with an embodiment of the present invention.
Figure 14B:
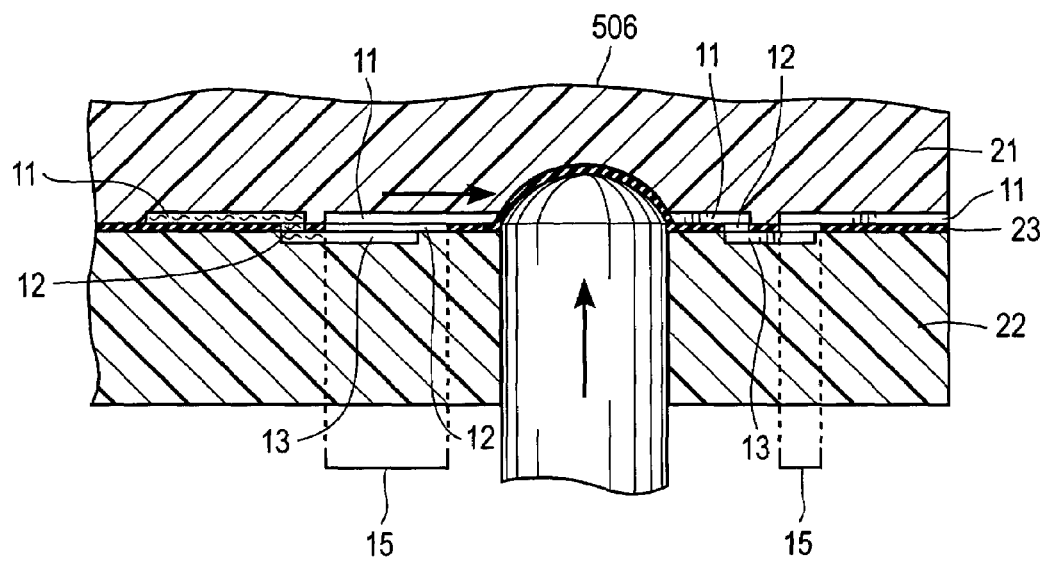
Figure 14C:
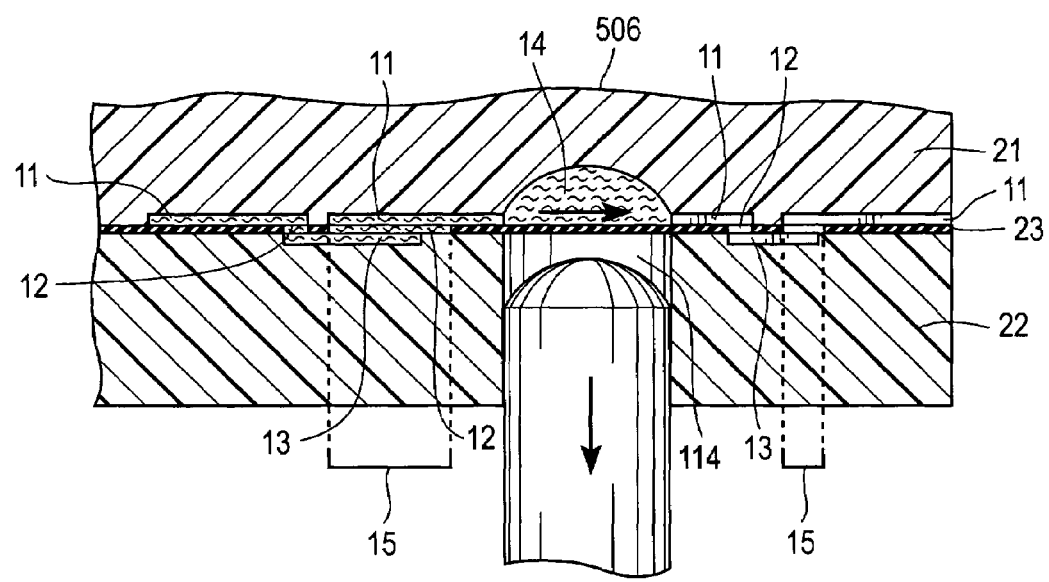

FIG. 13 is a top view of pump 506 of device 802 with direction errors to indicate the direction of fluid flow through pump 506 when the pump is activated. Pump 506 has the same architecture as the pump illustrated in FIG. 1, including two passive check valves 15 that provide a high resistance to flow in one direction only. Each passive check valve 15 includes a lower substrate channel 13 and an upper substrate channel 11. Flexible intermediate interlayer 23 (not shown in FIG. 13) separates channels 13 and 11 in each passive check valve 15. However, flexible intermediate interlayer 23 includes holes 12 within each passive check valve 15, thereby allowing fluid to flow from lower substrate channel 13 to upper substrate channel 11 in the manner depicted in FIG. 1E. FIGS. 14A–14E illustrate the movement of fluid through pump 506. In FIG. 14A, fluid enters pump 506 via upper substrate channel 11 from reaction chamber 520 and drops through hole 12 in flexible intermediate interlayer 23 into lower substrate channel 13. At this stage, the passive check valves 15 on the left hand side of pump 506 has the configuration illustrated in FIG. 1C, in which flexible intermediate interlayer 23 is pressed against lower substrate channel 13, thereby sealing it from the upper substrate channel 11 within the passive check valve. However, as illustrated in FIGS. 14B and 14C, the fluid in lower substrate channel 13 is drawn against flexible intermediate interlayer 23 causing upper substrate channel 11 and lower substrate channel 13 to come into fluid communication with the left hand passive check valve 15 via holes 12 in flexible intermediate interlayer 23 in the manner depicted in FIG. 1E. The force used to cause fluid in lower substrate channel 13 to push against flexible intermediate interlayer 23 to thereby raise it is provided by the actuator in pump 506.

When this actuator is removed, as illustrated in FIG. 14C, a vacuum within chamber 14 causes the fluid in lower substrate channel 13 to push against flexible intermediate interlayer 23 in the manner illustrated in FIG. 1E.

Figure 14D:
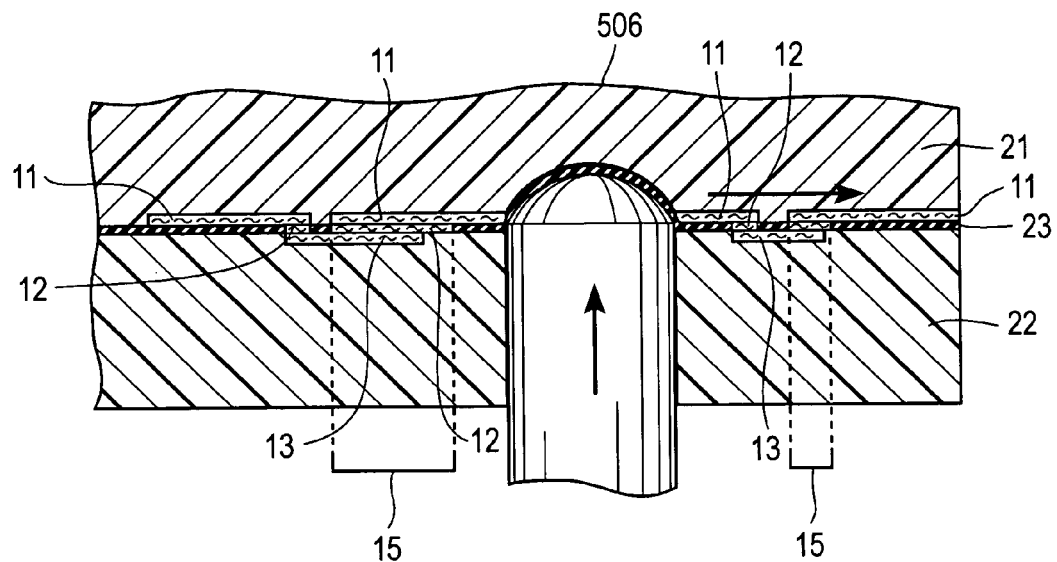
Figure 14E:
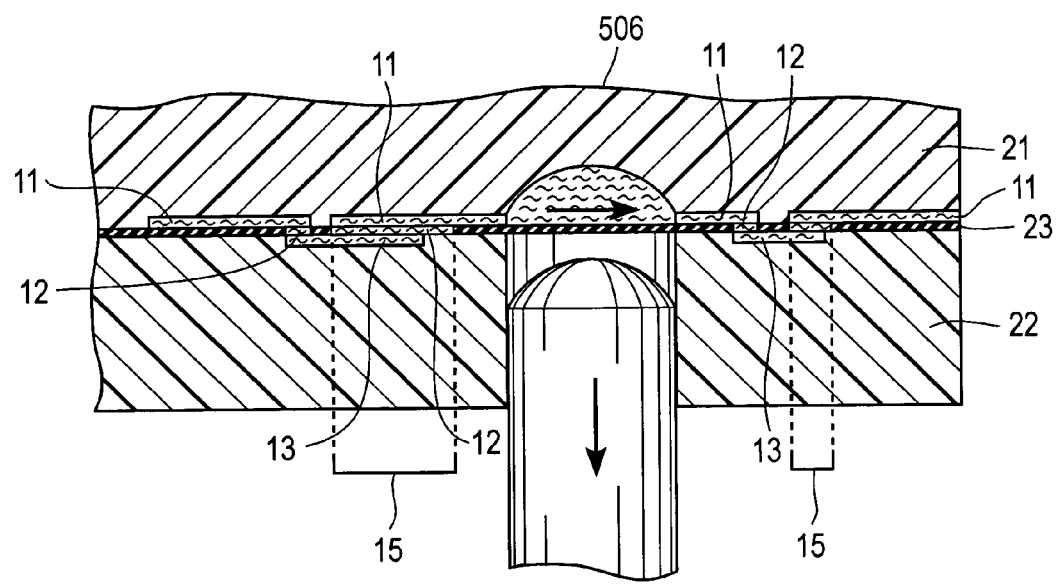

Next, referring to FIG. 14D, another movement of the actuator of pump 506 causes the fluid in chamber 14 to traverse the upper substrate channel 11 toward the right hand passive check valve 15 and to drop through hole 12 into the lower substrate channel 13 of the right hand passive check valve. Further, the force of the actuator of pump 506 causes the fluid in the lower substrate channel 13 of the right hand passive check value 15 to open up the flexible intermediate interlayer 23 within the right hand passive check value in the manner depicted in FIG. 1E. Thus, as illustrated in FIG. 14E, fluid exits pump 506 into open reservoir 510 by exiting pump 506 through upper substrate channel 11 of the right hand passive check valve of pump 506.

Figure 15:
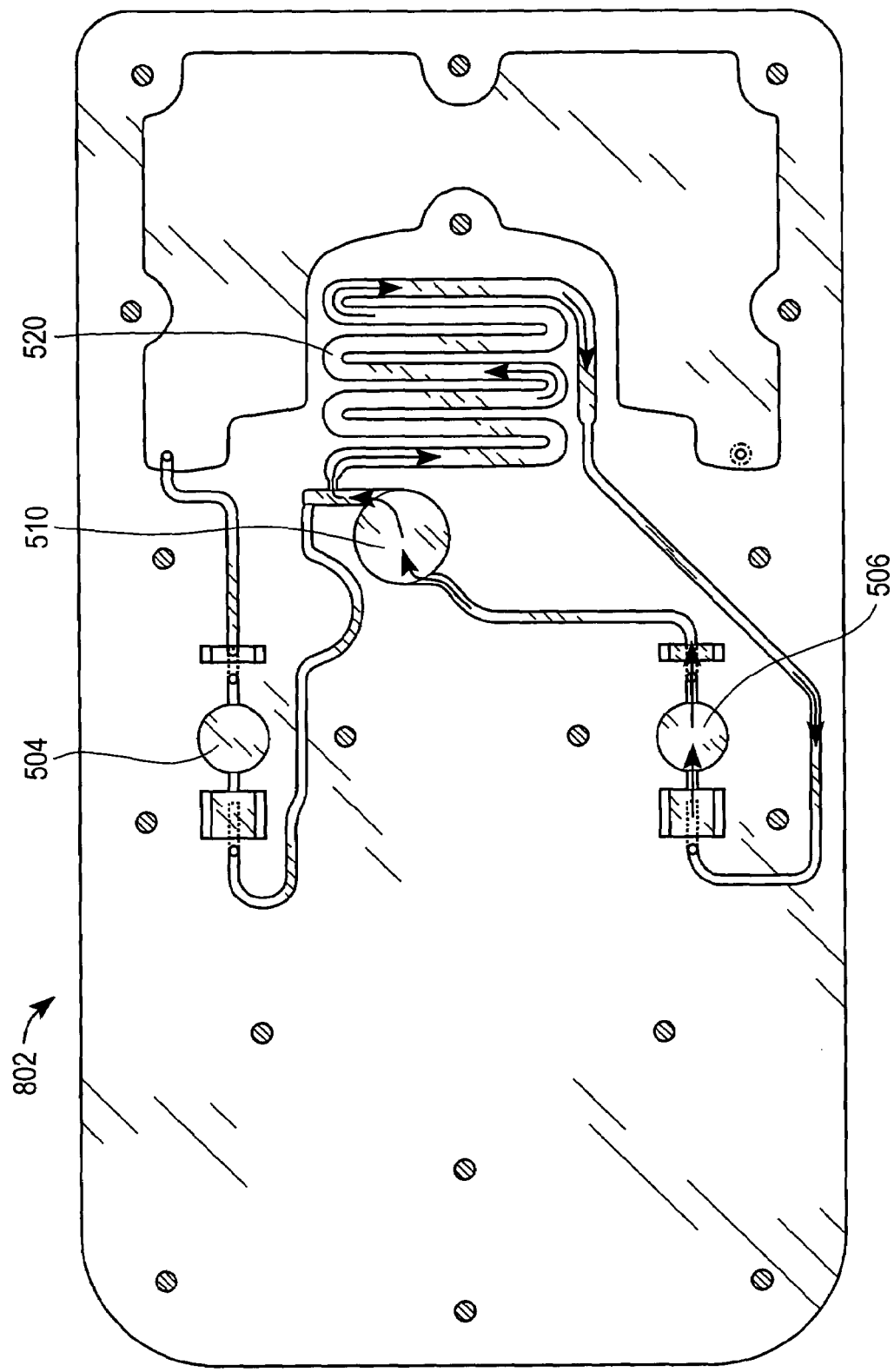
FIG. 15 illustrates a flow of fluid in a first state in a pull type microfluidic device in accordance with an embodiment of the present invention.
Figure 16:
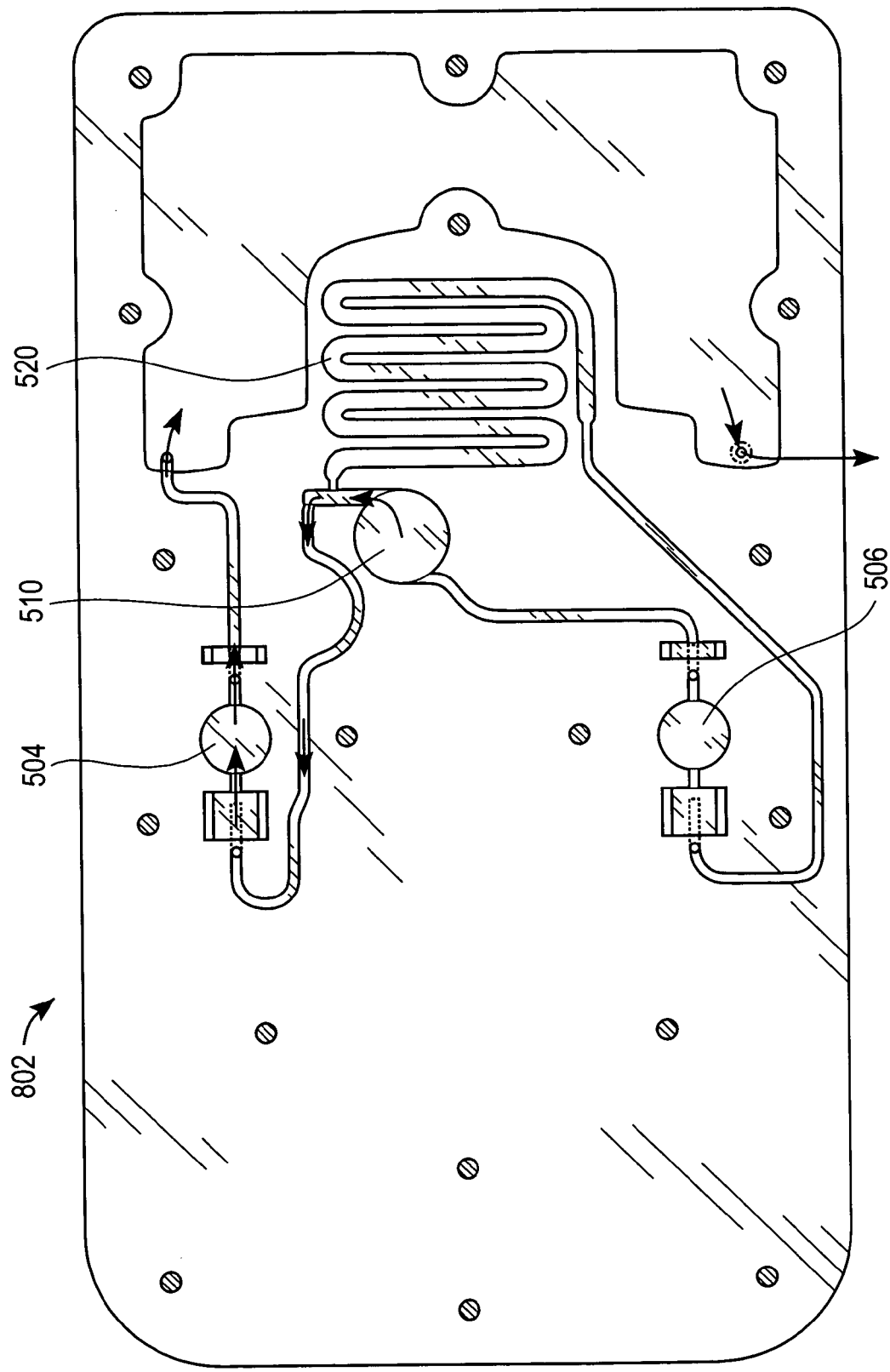
FIG. 16 illustrates a flow of fluid in a second state in a pull type microfluidic device in accordance with an embodiment of the present invention.

FIG. 15 illustrates a flow of fluid in device 802 when pump 506 is activated. As noted above, pump 506 pulls solution from reaction chamber back into open reservoir 510. FIG. 16 illustrates the flow of fluid device 802 when pump 504 is activated. Pump 504 drains fluid from open reservoir 510 and reaction chamber 520 into waste chamber 530. As further illustrated in FIG. 16, device 802 includes means for draining waste chamber 530 when desired.

CONCLUSION

All references cited herein are incorporated herein by reference in their entirety and for all purposes to the same extent as if each individual publication or patent or patent application was specifically and individually indicated to be incorporated by reference in its entirety for all purposes.

Many modifications and variations of this invention can be made without departing from its spirit and scope, as will be apparent to those skilled in the art. Reference has been made to certain microfluidic devices. However, the specific embodiments described herein are offered by way of example only, and the invention is to be limited only by the terms of the appended claims, along with the full scope of equivalents to which such claims are entitled.

What is claimed is:

1. An apparatus, comprising:
   a fluidic cartridge including a first substrate, a second substrate and a flexible intermediate interlayer, wherein said flexible intermediate interlayer is sealedly interfaced between said first substrate and said second substrate to form therein a plurality of channels of capillary dimensions;
   at least an open reservoir, a first pump chamber, and a reaction chamber formed at least partially in said first substrate or said second substrate of said fluidic cartridge, wherein said open reservoir and said reaction chamber are each connected to said first pump chamber through channels in said plurality of channels and wherein said open reservoir and said reaction chamber are in fluid communication with each other via a channel in said plurality of channels;
   a fluid flow controlling structure, formed in said fluidic cartridge, restricting a flow of a fluid through said reaction chamber via said plurality of channels to one direction only; and
   a linear actuator providing a pumping action in said first pump chamber to pump said fluid to recirculate from said reaction chamber to said open reservoir via said first pump chamber and said plurality of channels.

2. The apparatus as recited in claim 1, wherein
   said first pump chamber has a substrate chamber formed in said first substrate; and
   a hole formed in said second substrate to free said flexible intermediate interlayer to act as a pump interlayer diaphragm, wherein said linear actuator moves in said hole to bend said pump interlayer diaphragm and therefore provide a necessary force to provide a pumping action in said first pump chamber to pump said fluid to recirculate from said reaction chamber to said open reservoir via said first pump chamber and said plurality of channels.

3. The apparatus as recited in claim 1, wherein said fluid flow controlling structure comprises two passive check valves positioned before and after said first pump chamber in said fluidic cartridge to provide a higher resistance to a fluid to flow from said open reservoir to said reaction chamber via said first pump chamber and said plurality of channels and a lower resistance to a fluid to flow from said reaction chamber to said open reservoir via said first pump chamber and said plurality of channels.

4. The apparatus of claim 3, wherein each of said two passive check valves comprise a first substrate channel and a second substrate channel separated by said flexible intermediate interlayer wherein through holes formed in said flexible intermediate interlayer are contained within said first substrate channel but not within said second substrate channel.

5. The apparatus of claim 1, wherein said reaction chamber contains a plurality of immobilized bio-molecules for specific solid-phase reaction with said fluid, wherein after a predetermined period of reaction time, said fluid is pumped out through a second pump chamber into a waste reservoir, wherein said second pump chamber and said waste reservoir are formed at least partially in said first substrate or said second substrate of said fluidic cartridge.

6. The apparatus of claim 5, wherein said plurality of immobilized bio-molecules is selected from the group consisting of immobilized antibodies and immobilized antigens.

7. The apparatus of claim 1, wherein said fluidic cartridge is constructed from a plastic material.

8. The apparatus of claim 1, wherein said first substrate is made of transparent plastic material and said channels, said reaction chamber and said first pump chamber are made by a method selected from the group consisting of injection molding, compression molding, hot embossing, and machining.

9. The apparatus of claim 1, wherein each of said first substrate and said second substrate has a thickness of between 1 mm and 3 mm.

10. The apparatus of claim 1, wherein said flexible intermediate interlayer is made from a material selected from the group consisting of polymer, latex, silicone elastomer, polyvinylchloride, and fluoroelastomer.

11. The apparatus of claim 1, wherein said flexible intermediate interlayer is made by a method selected from the group consisting of die cutting, rotary die cutting, laser etching, injection molding, and reaction injection molding.

12. The apparatus of claim 1, the apparatus further comprising
   a second pump chamber that is in fluid communication with said open reservoir;
   a second fluid controlling structure; and
   a waste reservoir that is in fluid communication with said second pump chamber, wherein said second pump chamber, said second fluid controlling structure and said waste reservoir are formed at least partially in said first substrate or said second substrate of said fluidic cartridge.

13. The apparatus as recited in claim 12, wherein said fluid flow controlling structure comprises two passive check valves positioned before and after said second pump chamber in said fluidic cartridge to provide a lower resistance to a fluid to flow from said open reservoir to said waste reservoir via said second pump chamber and a higher resistance to a fluid to flow from said waste reservoir to said open reservoir via said second pump chamber.

14. The apparatus as recited in claim 1, wherein said reaction chamber comprises a channel in said first substrate and wherein said channel has a serpentine configuration.

15. A fluidic device, comprising:
a first substrate, a second substrate and an flexible intermediate interlayer sealedly interfaced between said first substrate and said second substrate to form therein a plurality of channels of capillary dimensions, a pump chamber, an open reservoir, and at least a reaction chamber connected to said plurality of channels; and
means for restricting a fluid being pumped to recirculate from said at least a reaction chamber to said open reservoir via said pump chamber and said plurality of channels.

16. The fluidic device, as recited in claim 15, wherein said pump chamber has a substrate chamber formed in said first substrate and a hole formed in said second substrate to free said flexible intermediate interlayer to act as a pump interlayer diaphragm, whereby a linear actuator of the fluidic device is capable of moving in said hole to bend said pump interlayer diaphragm and therefore provide a necessary force to deform said pump interlayer diaphragm to provide a pumping action in said pump chamber to pump said fluid recirculate from said at least a reaction chamber to said open reservoir via said pump chamber and said plurality of channels.

17. The fluidic device of claim 16, wherein said means for restricting a fluid comprises a first passive check valve positioned before said pump chamber and a second passive check value positioned after said pump chamber in said fluidic device.

18. The fluidic device of claim 16, wherein said means for restricting a fluid comprises two passive check valves in said fluidic device to restrict said fluid to flow from one of said plurality of channels in said second substrate to another one of said plurality of channels in said first substrate by bending of said pump interlayer diaphragm, wherein any flow of said fluid in an opposite direction is controlled by restricting said bending of said pump interlayer diaphragm with said second substrate.

19. The fluidic device of claim 18, wherein each of said two passive check valves comprise a first substrate channel and a second substrate channel separated by said flexible intermediate interlayer wherein through holes formed in said flexible intermediate interlayer are contained within said first substrate channel but not within said second substrate channel.

* * * * *